Oct. 4, 1927.
A. K. MALMQUIST
1,643,990
CANNING APPARATUS
Filed Aug. 18, 1922
19 Sheets-Sheet 6
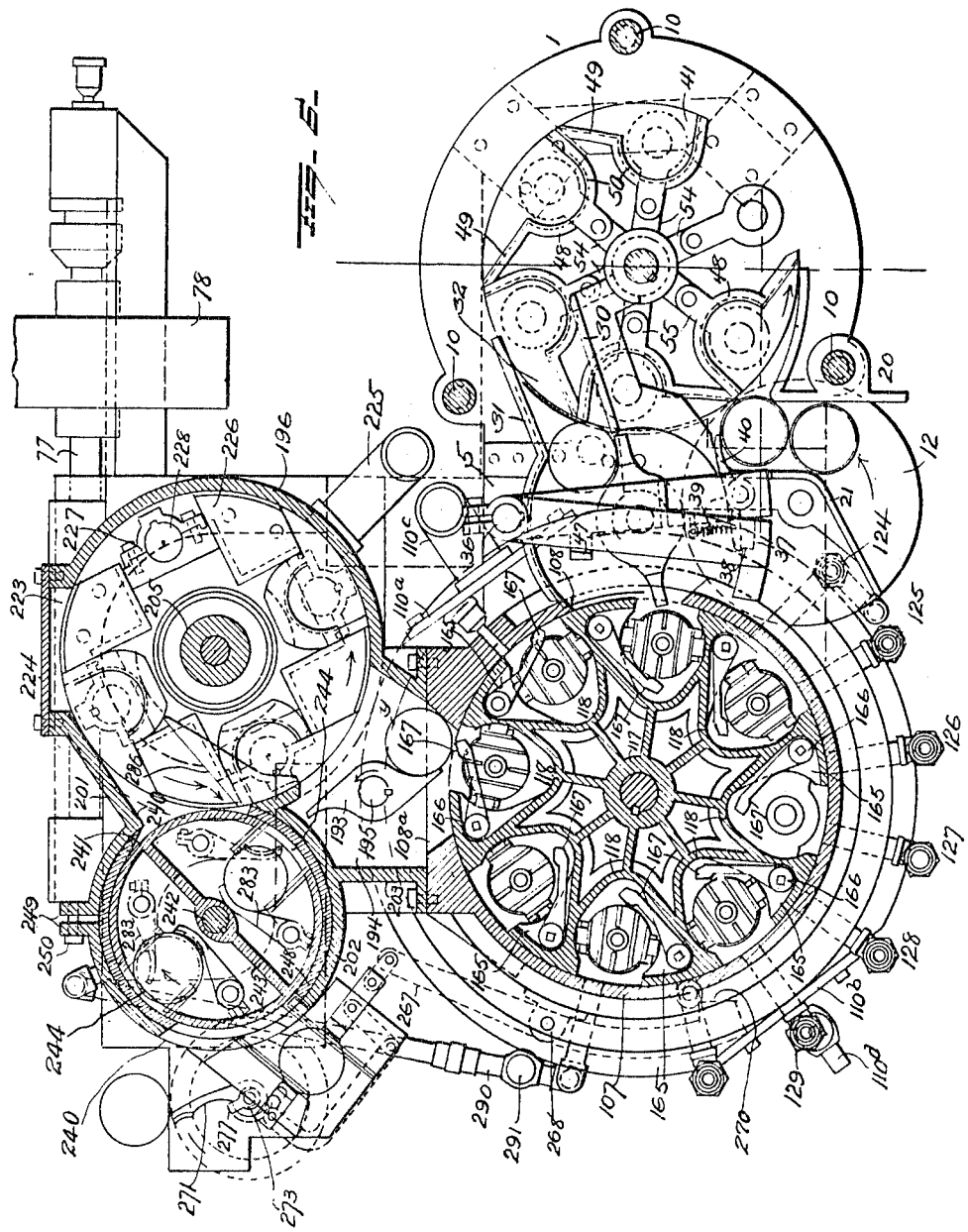
Inventor
A. K. Malmquist
By Seymour & Bright
Attorneys

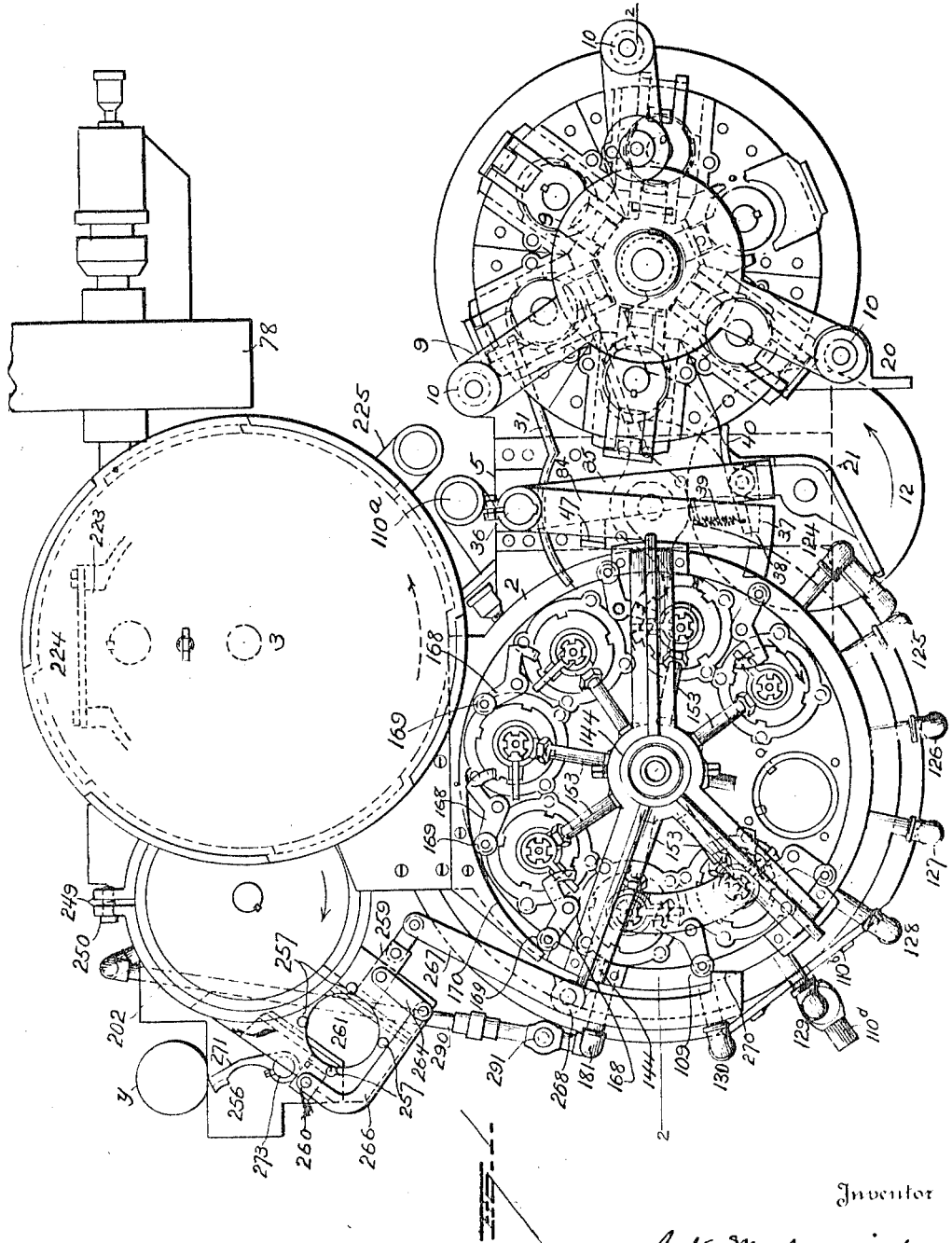

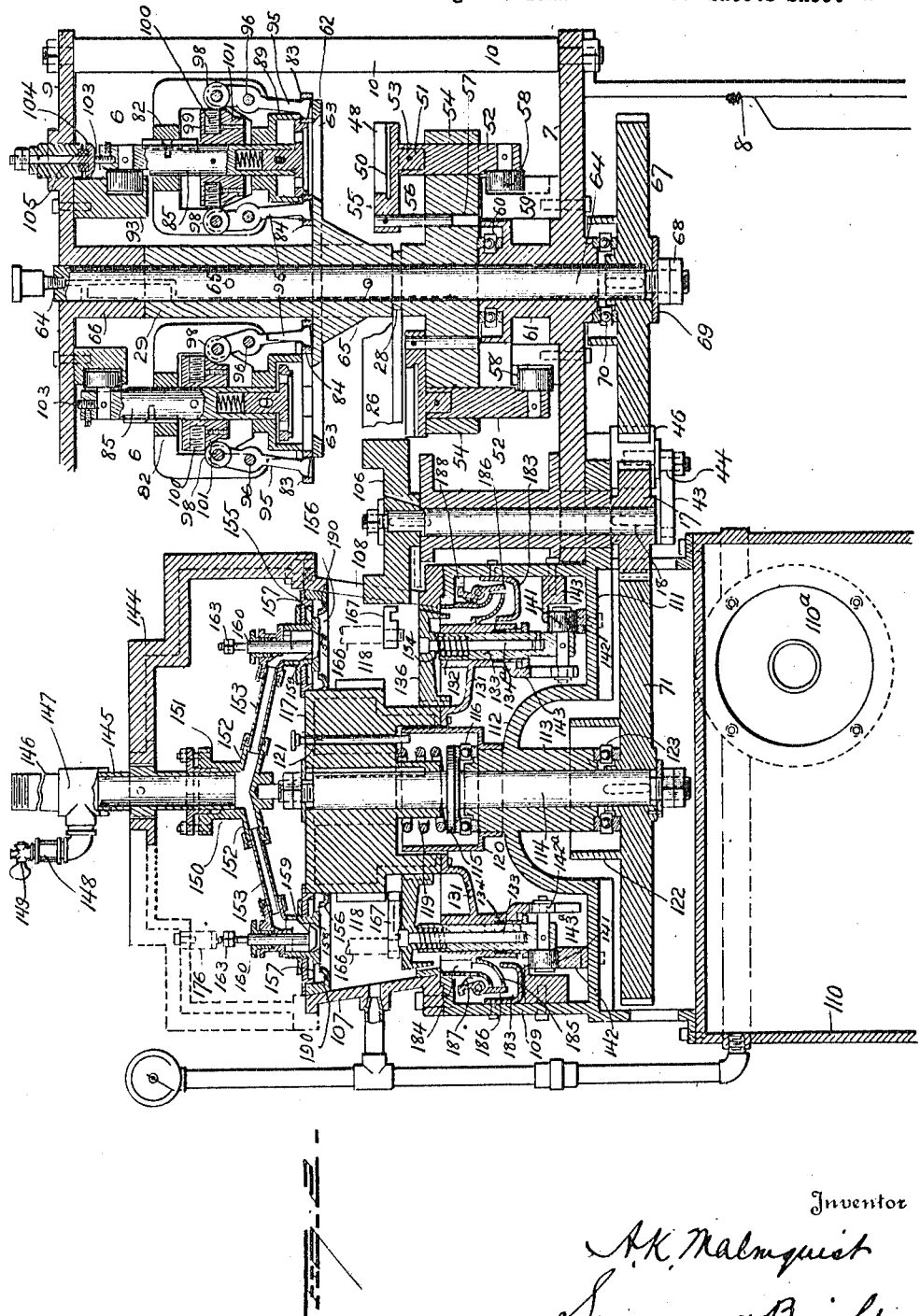

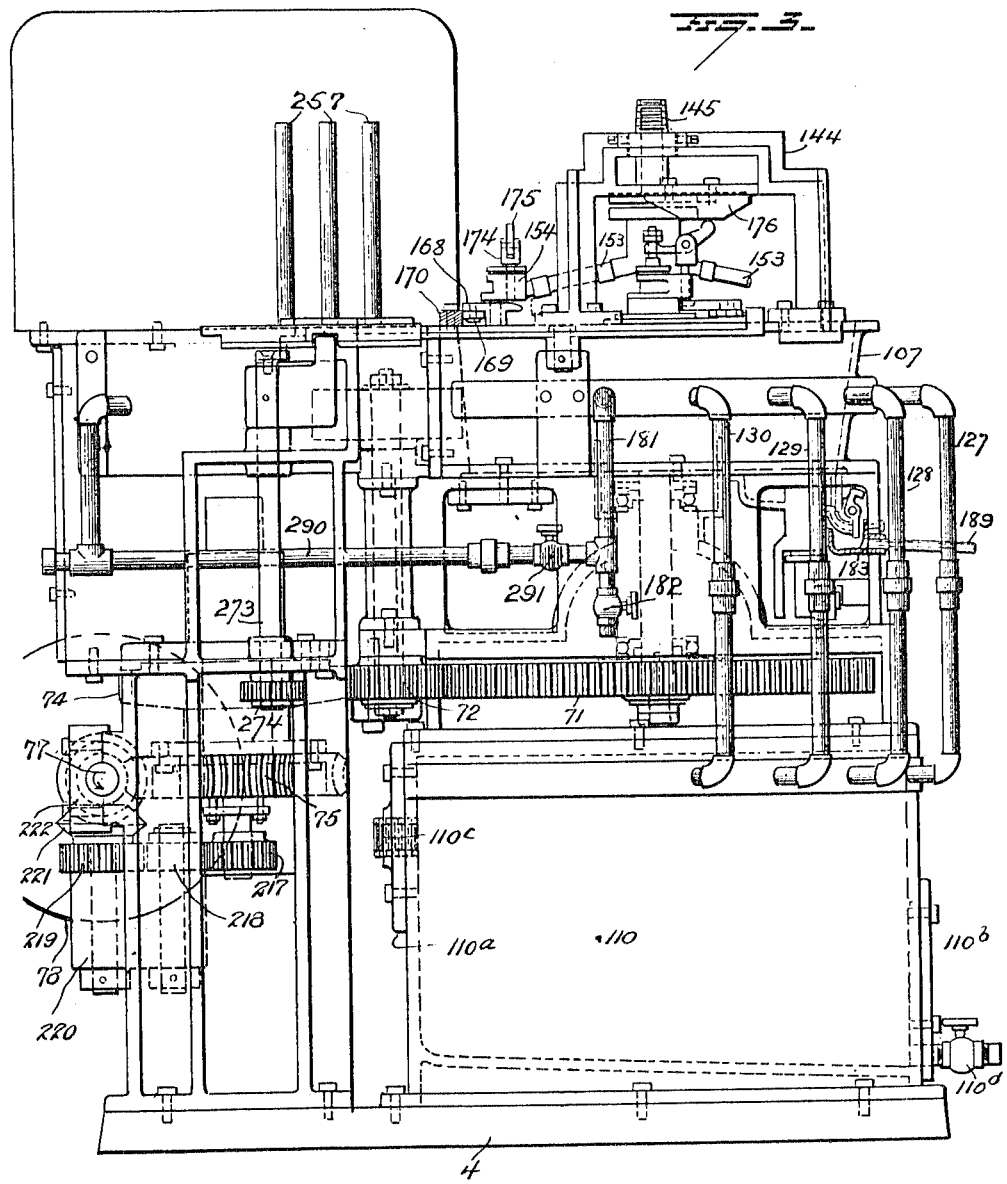

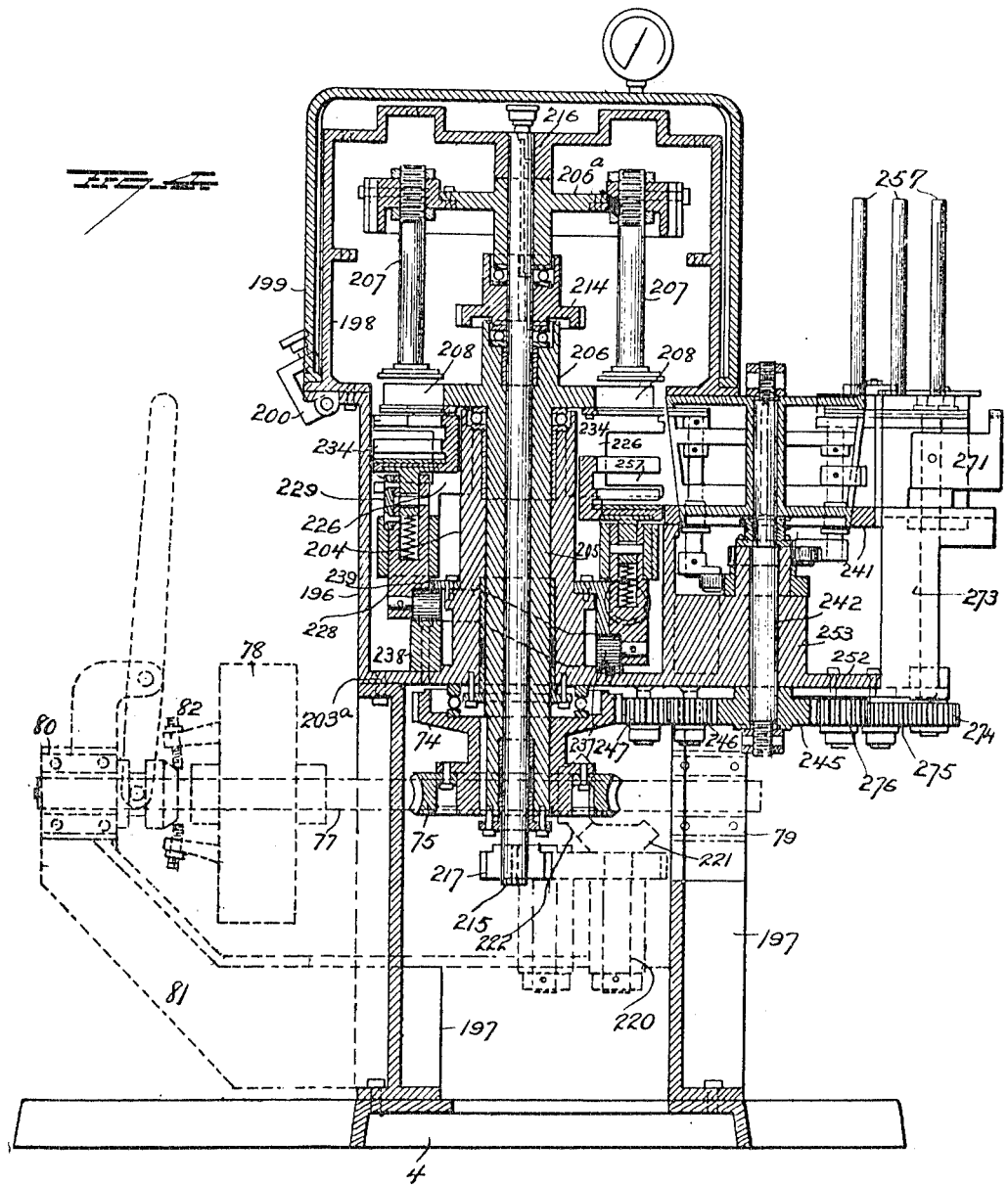

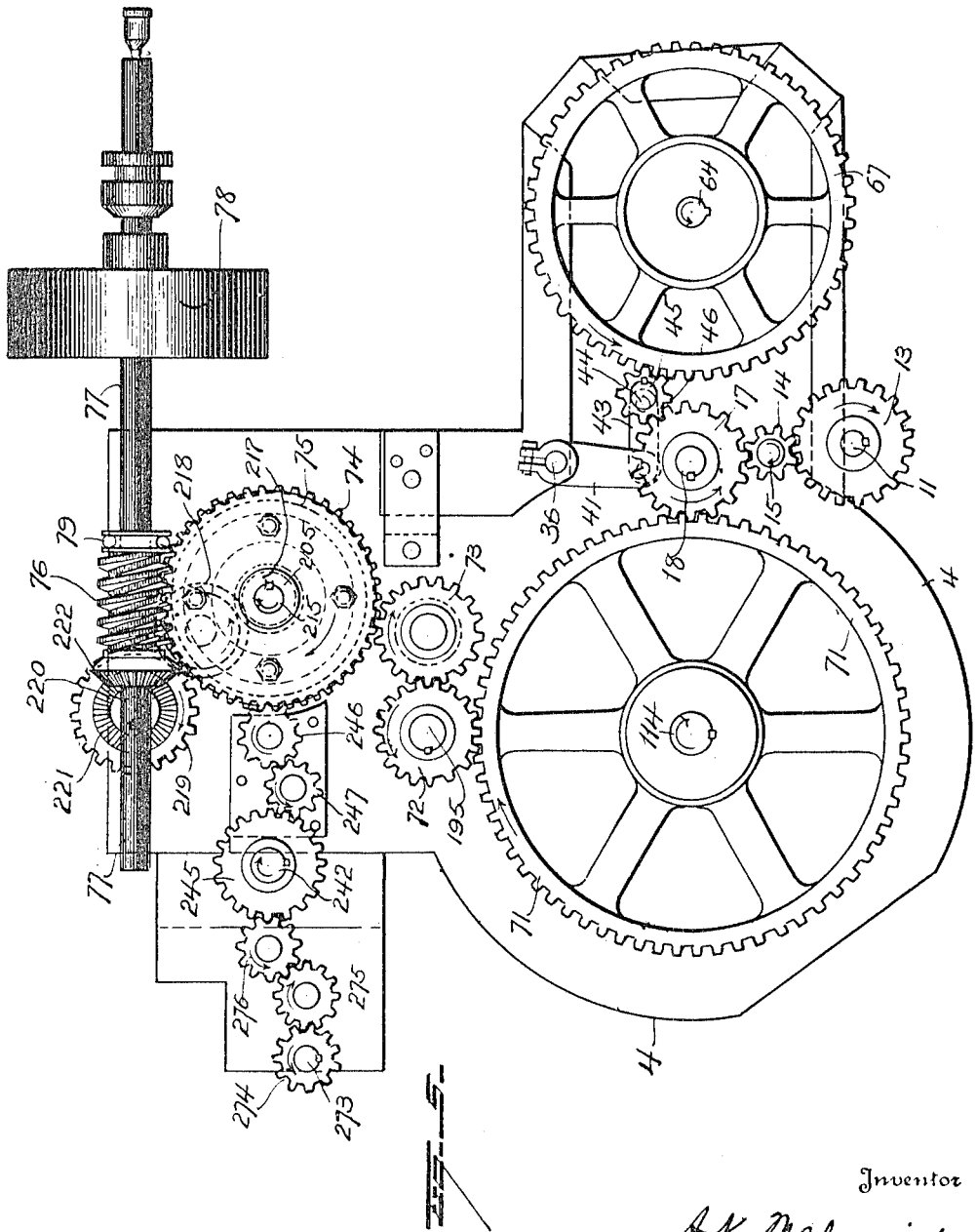

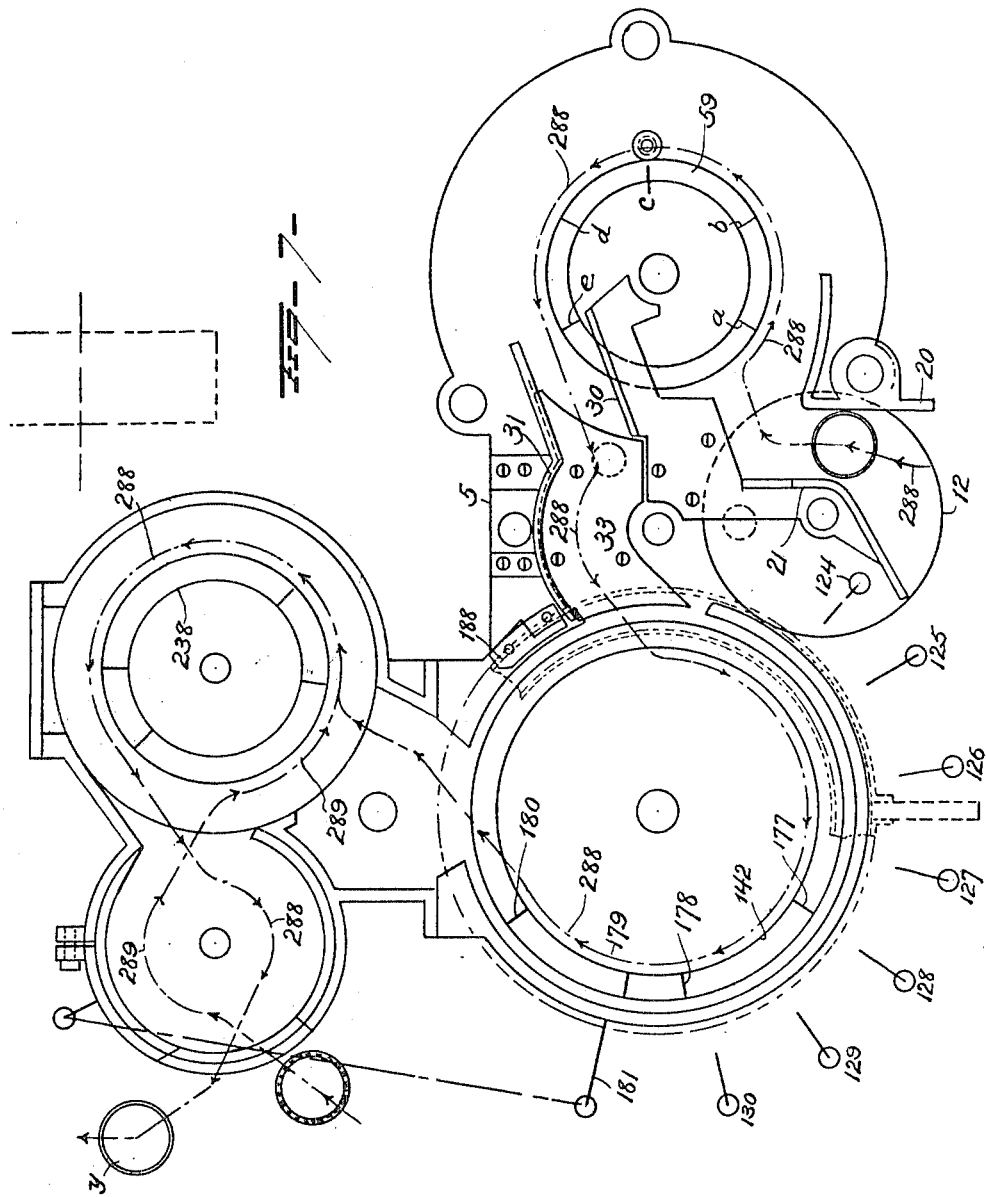

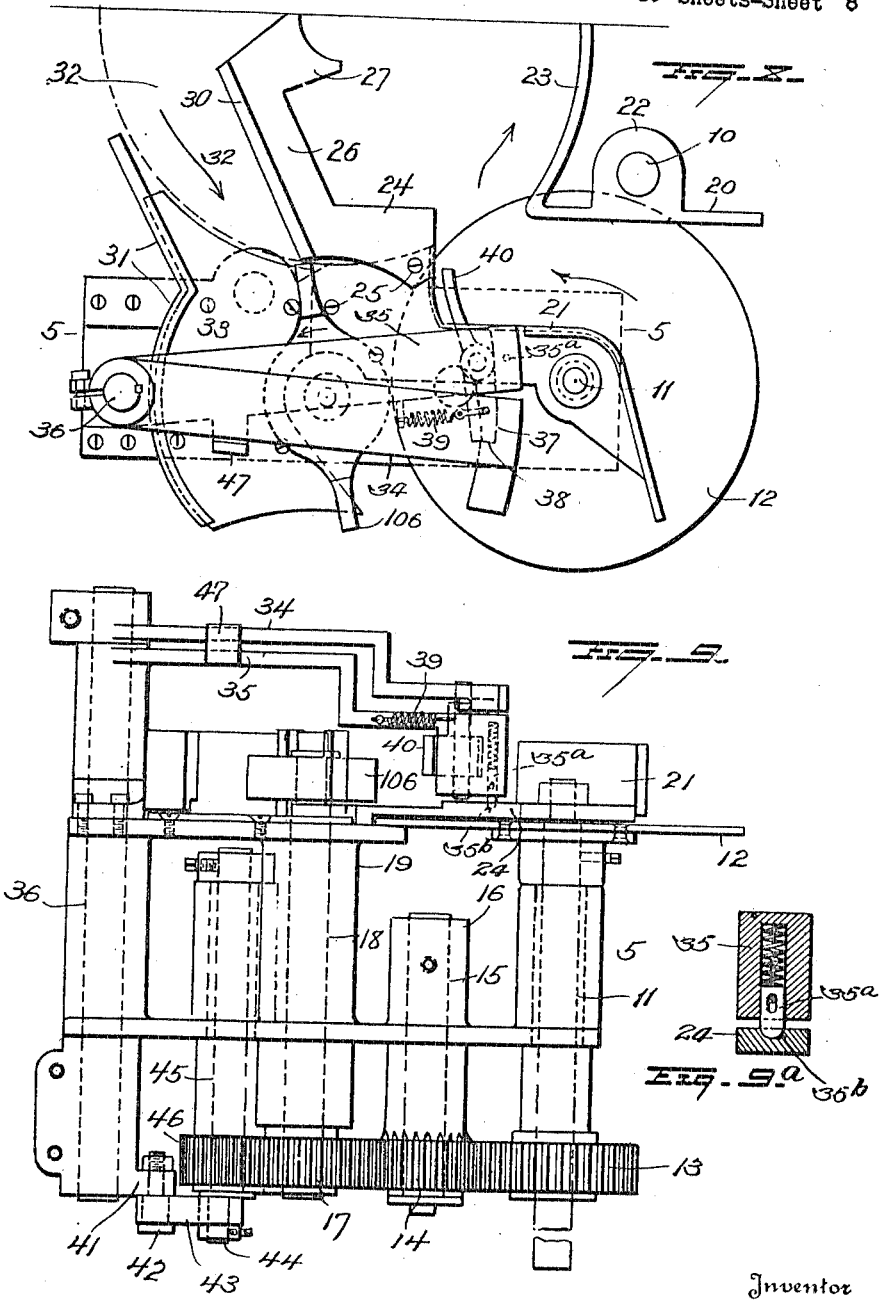

Oct. 4, 1927.
A. K. MALMQUIST
1,643,990
CANNING APPARATUS
Filed Aug. 18, 1922
19 Sheets-Sheet 9
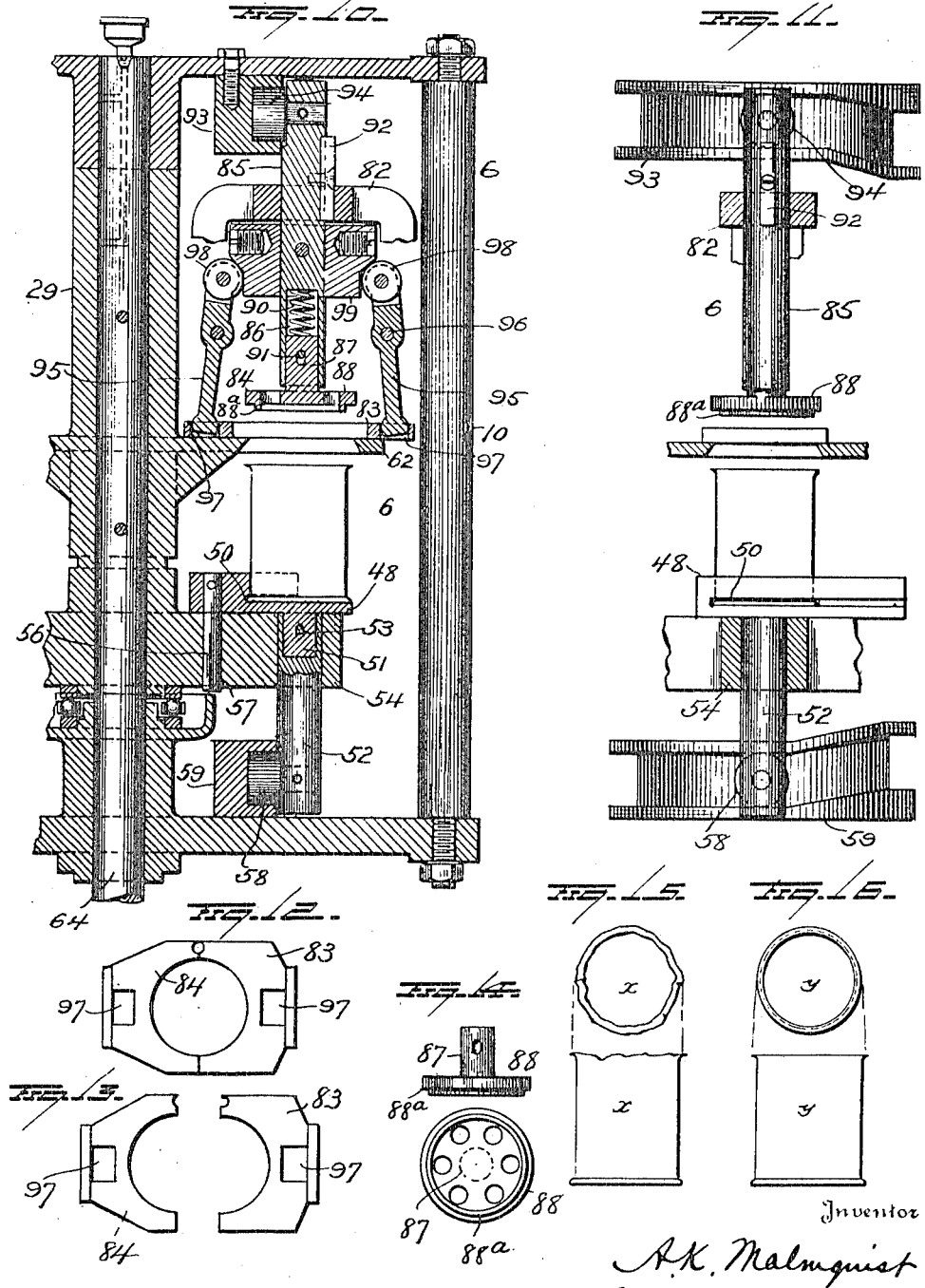

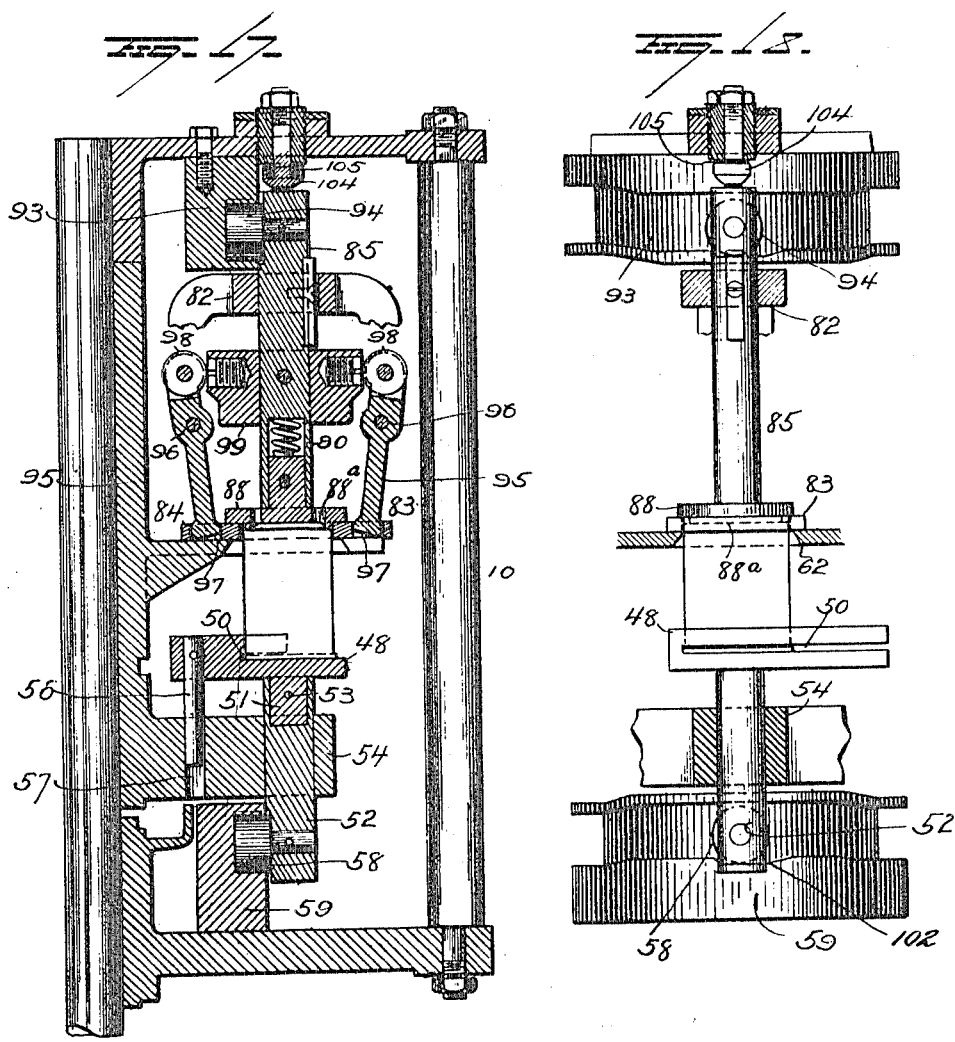

Oct. 4, 1927.
A. K. MALMQUIST
1,643,990
CANNING APPARATUS
Filed Aug. 18, 1922
19 Sheets-Sheet 11
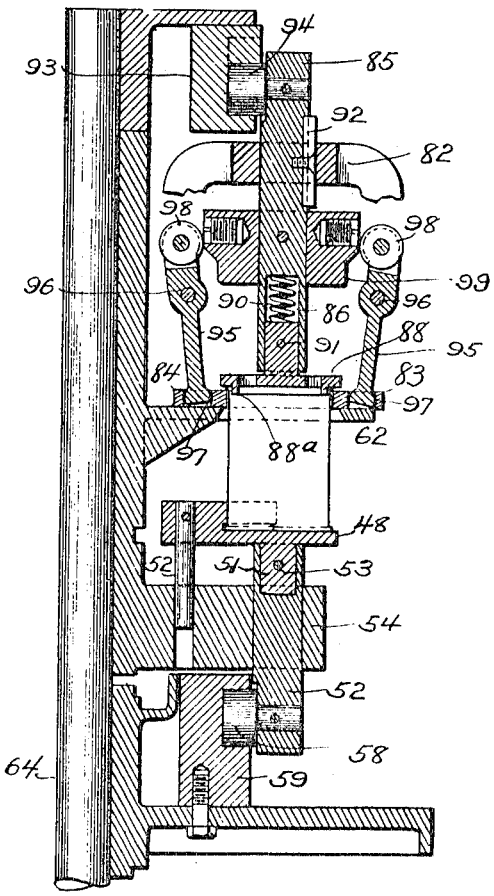
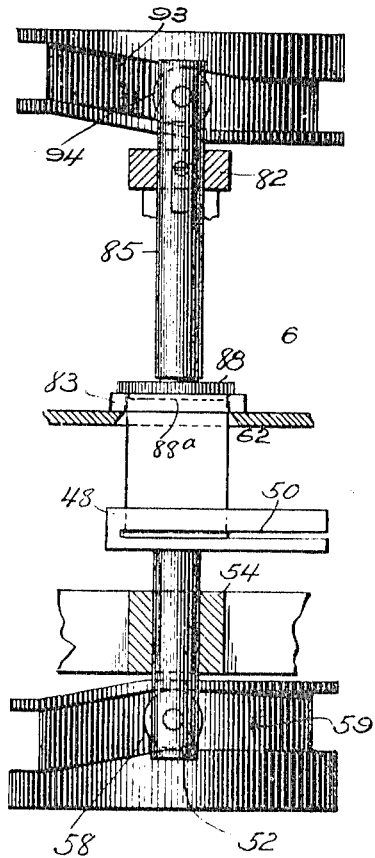

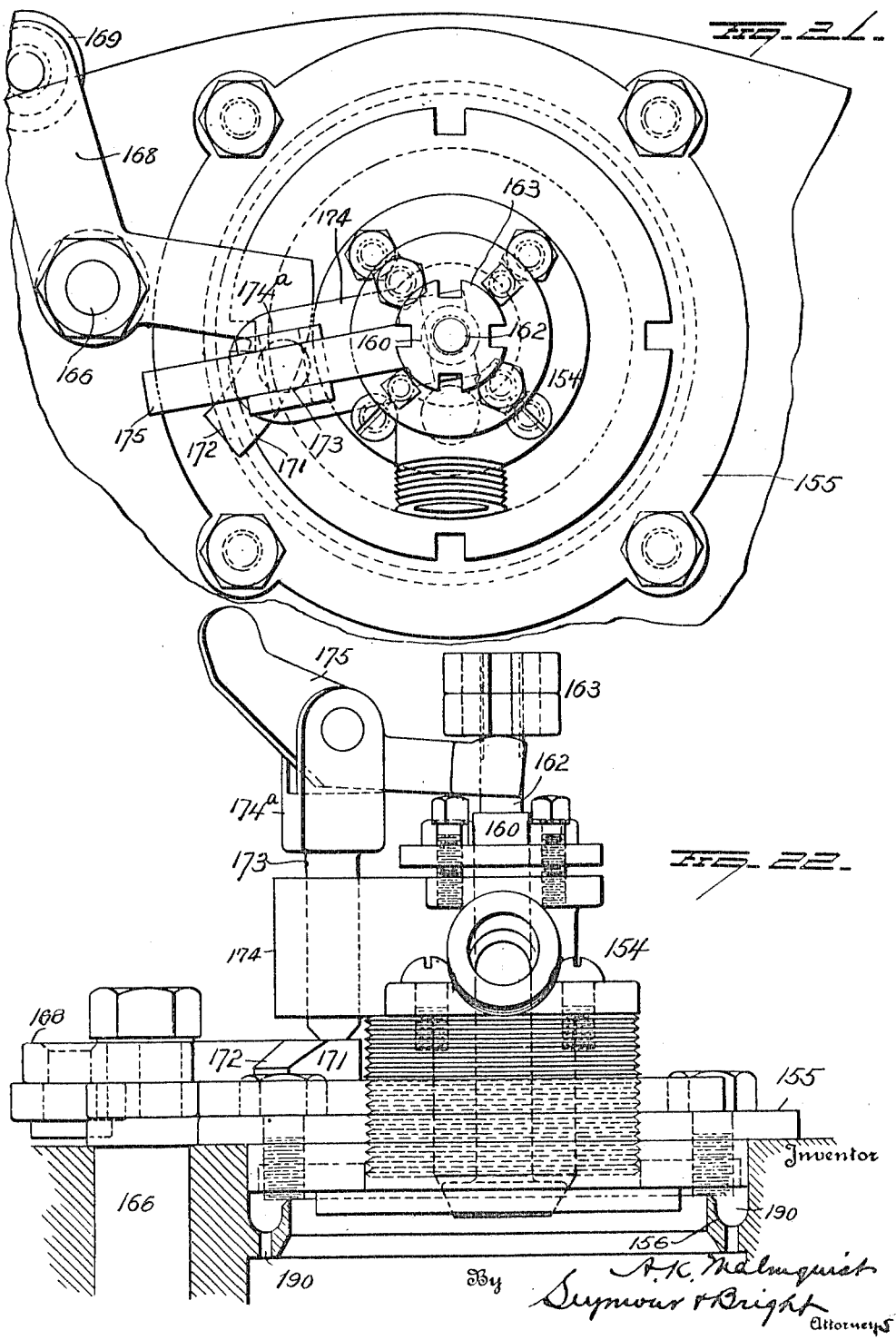

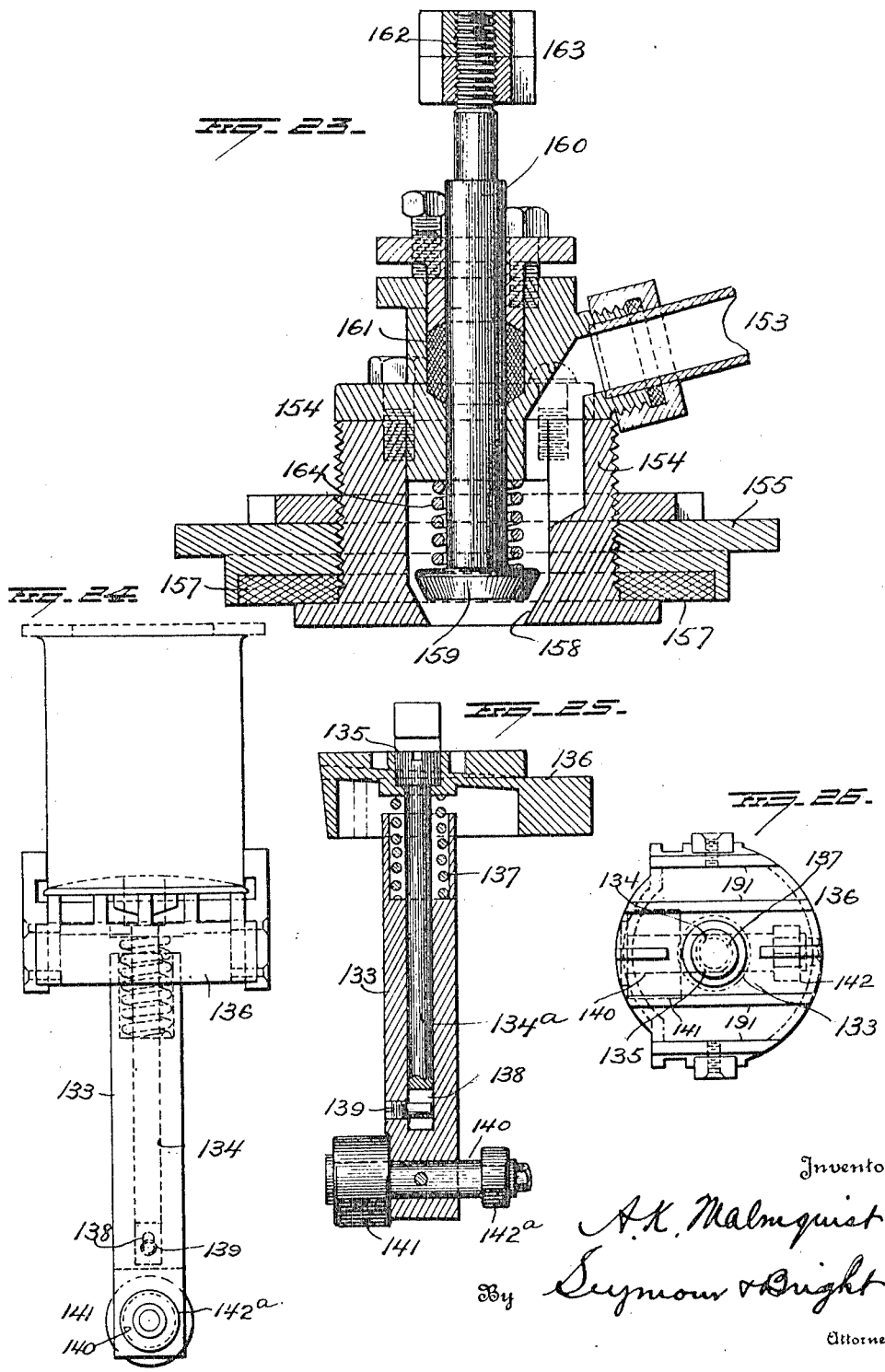

Oct. 4, 1927.
A. K. MALMQUIST
CANNING APPARATUS
Filed Aug. 18, 1922
1,643,990
19 Sheets-Sheet 14
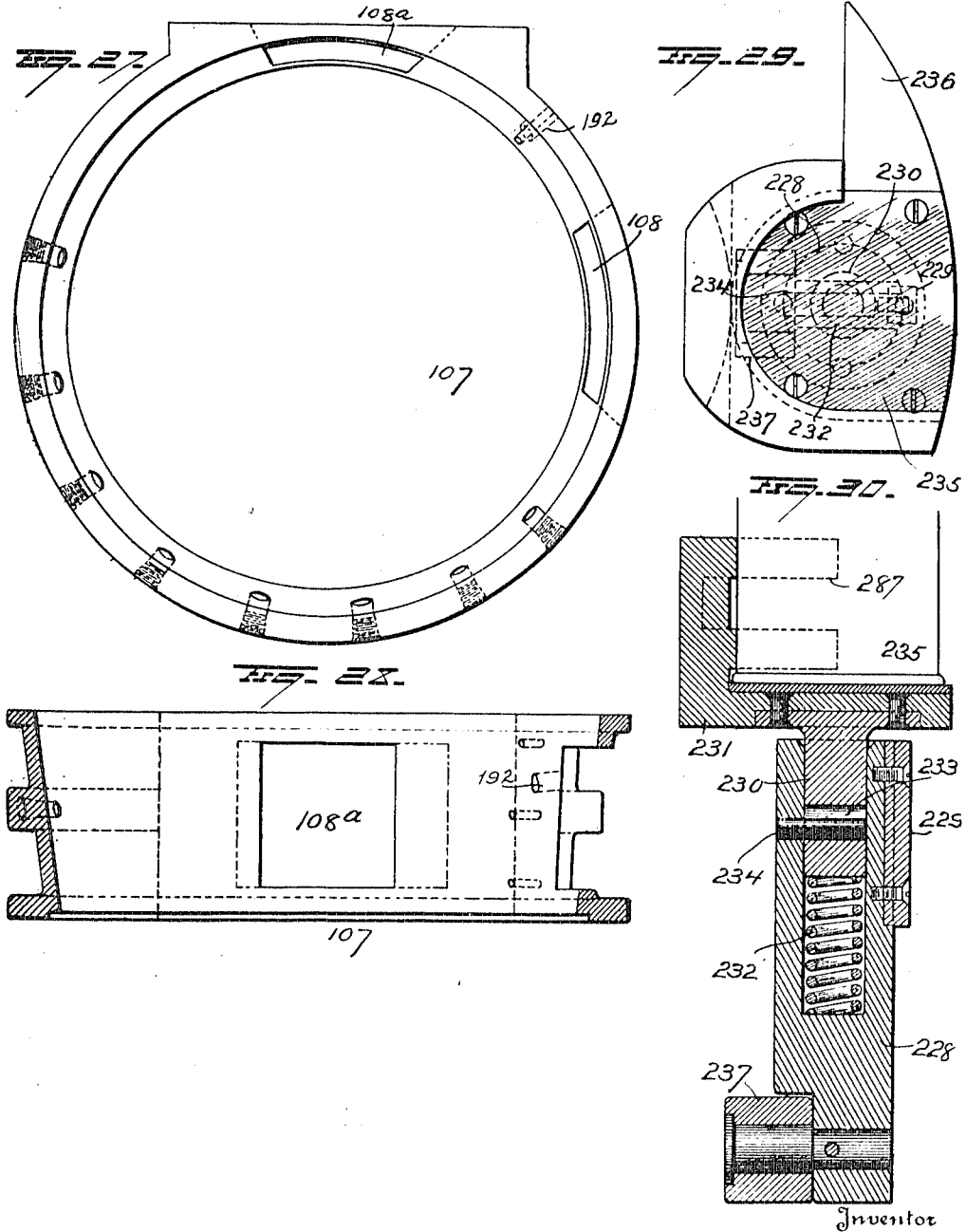
Inventor
A. K. Malmquist
By Seymour & Bright
Attorneys

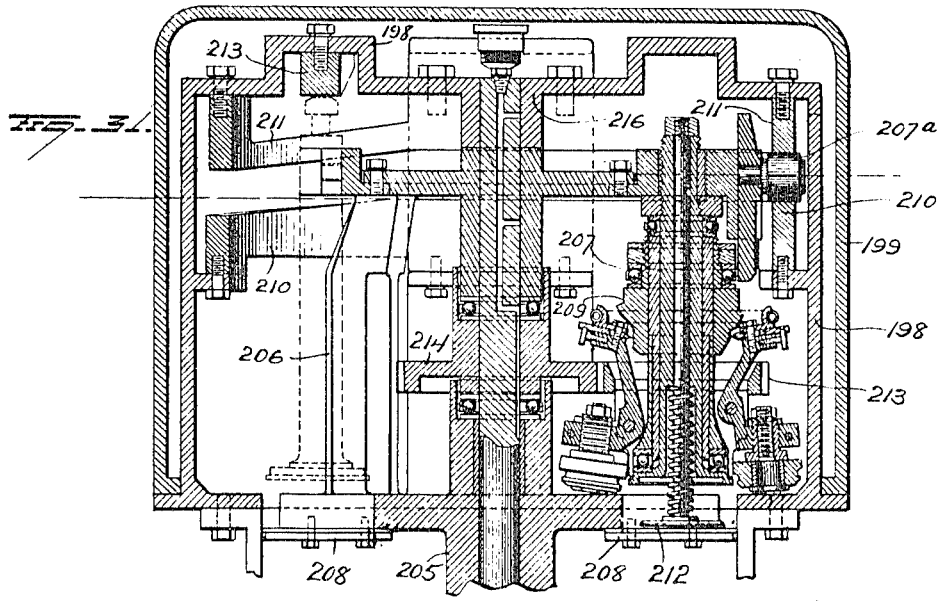
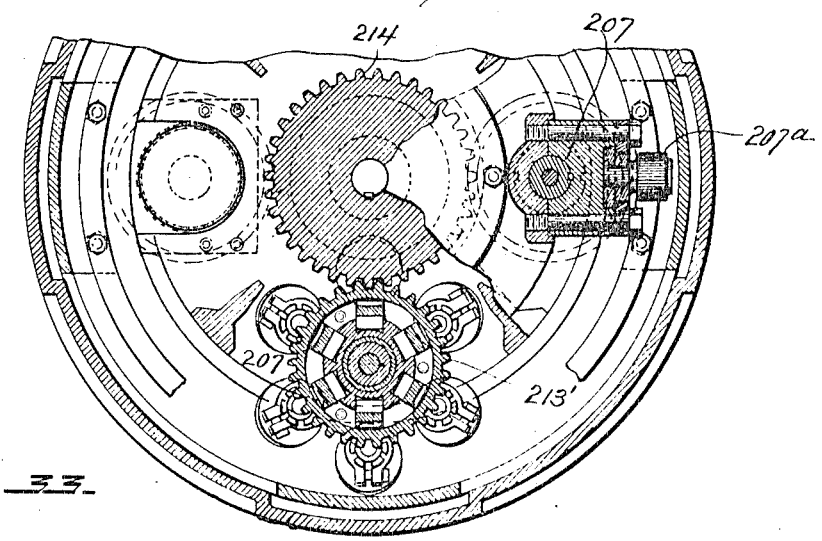
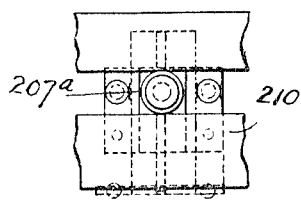

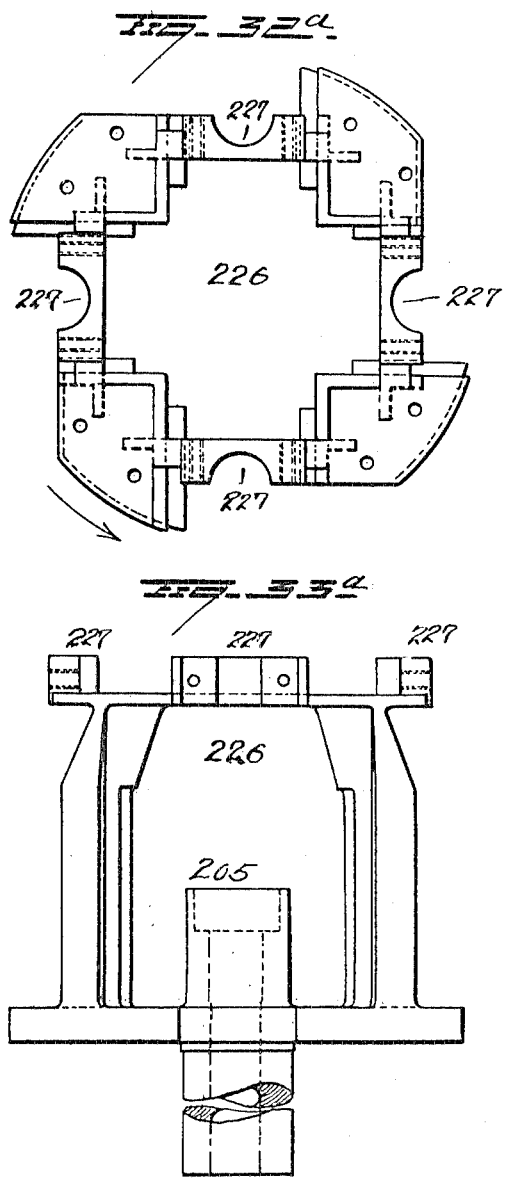

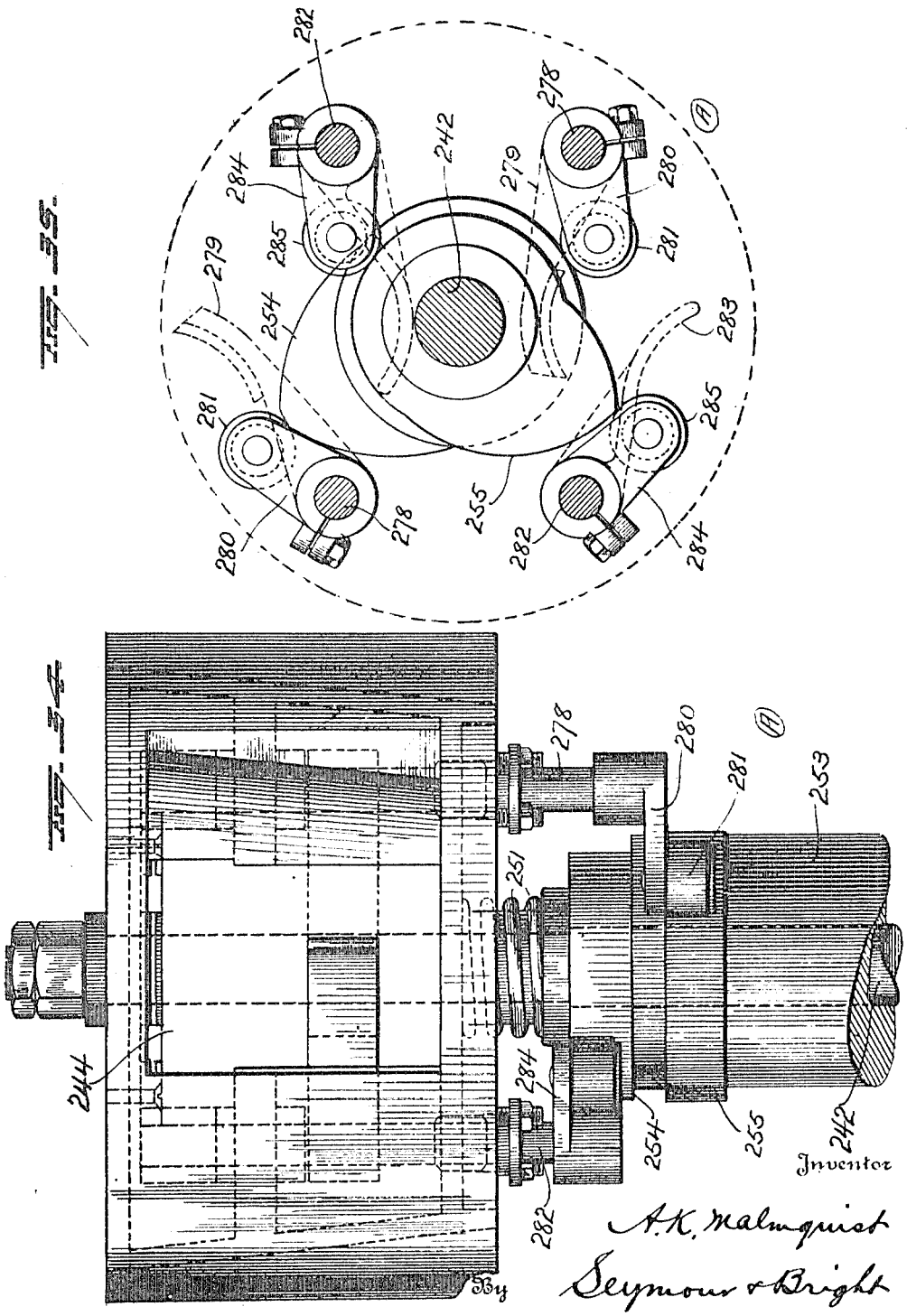

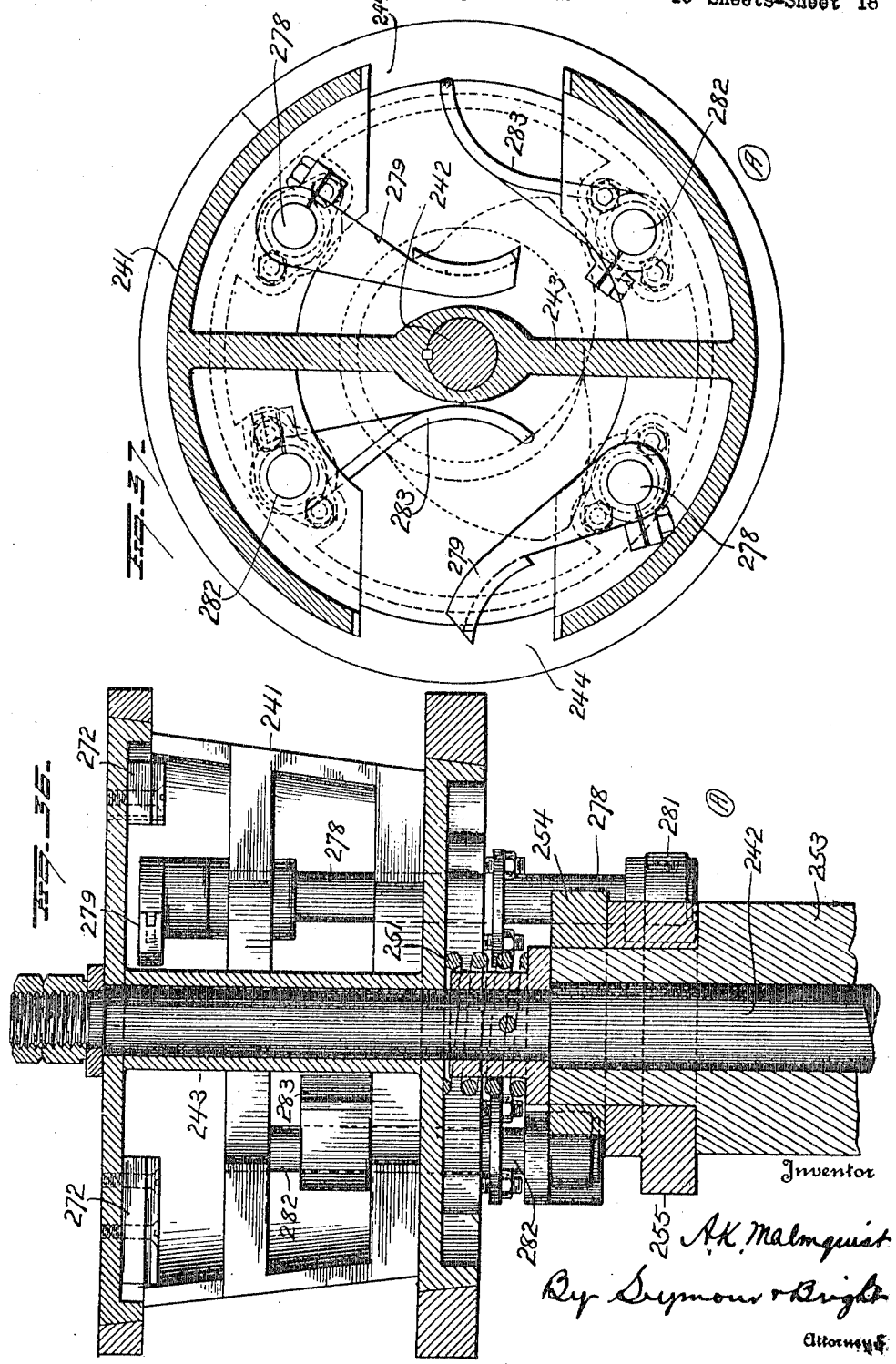

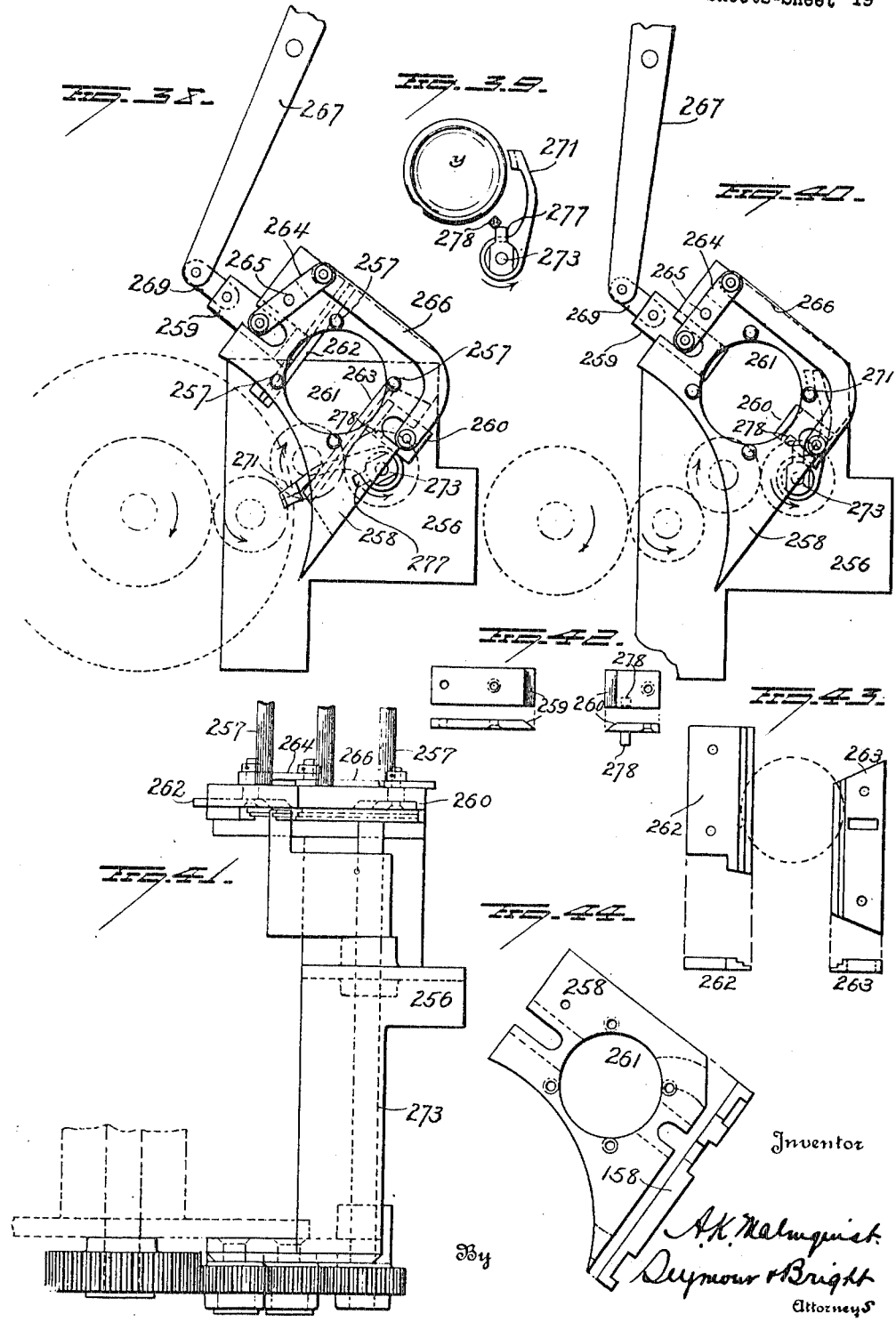

Patented Oct. 4, 1927.

1,643,990

UNITED STATES PATENT OFFICE.

ADOLPH K. MALMQUIST, OF SOUTH BELLINGHAM, WASHINGTON, ASSIGNOR, BY MESNE ASSIGNMENTS, TO THERMOKEPT CORPORATION, OF NEW YORK, N. Y., A CORPORATION OF DELAWARE.

CANNING APPARATUS.

Application filed August 18, 1922. Serial No. 582,712.

This invention relates to an improvement in canning apparatus.

Heretofore, difficulty has been experienced in satisfactorily filling and sealing cans in vacuum on account of imperfections in the open flanged portion of some of the cans. In order to obtain good results, the open end portion of cans and their flanges must be correct and regular, otherwise good results cannot be obtained. A dented or irregular can flange will not seat properly and accurately on a pad under the filling valve; the can will leak and will not be uniformly filled with liquid, and when the cap or cover is afterwards seamed to a dented can flange, the cement or paper lining used in the cap as a packing in the seam, will be spoiled by sharp pointed dents on the flange of the can, such pointed dents causing the packing to be cut while the finished can might seem from external appearance to have been perfectly sealed, but it will leak to a greater or less extent. The leak might be very small, but it will become enlarged in the final cooking operation and may (in the event of a very small leak) become closed when the can cools. The can might then be tight, but the vacuous condition therein will have become destroyed and the contents of the can will not be preserved as well as it would if all the cans be perfectly sealed before leaving the vacuous seaming chamber.

One object of my present invention is to provide means in a canning apparatus, whereby the perfect sealing of cans in vacuum shall be insured.

A further object is to provide means which shall be operable automatically to insure the correct and accurate formation of the open end of the cans and their flanges before they are applied to the liquid filling means.

A further object is to provide a canning apparatus which shall operate automatically to exhaust a chamber in which a can which may contain solid food is located; to fill such can with liquid while in said vacuous chamber; to reduce the degree of vacuum in said chamber; to transfer the filled can to another chamber; to create a vacuous condition in said last-mentioned chamber, and to effectually seal a cap to the can in said last-mentioned chamber while the vacuous condition is maintained therein.

A further object is to provide can sealing apparatus which shall operate automatically to perfect or shape the flanged open portions of cans; to discharge liquid into each can while the same is contained in a vacuous chamber; to transfer each can to another vacuous chamber; to supply a cap for each can; to seam the cap to the can while the vacuous condition is maintained in the last-mentioned vacuous chamber, and finally to discharge the hermetically sealed can.

With these and other objects in view, the invention consists in certain novel features of construction and combinations and arrangement of parts as hereinafter set forth and pointed out in the claims.

In the accompanying drawings; Figure 1 is a plan view of the apparatus; Figure 2 is a sectional view on the line 2—2 of Figure 1 showing the can flange perfecting and the liquid filling mechanisms; Figure 3 is a view in side elevation showing the filling and sealing portions of the apparatus and driving gearing; Figure 4 is a sectional view showing parts of the seaming mechanism, the valve or transfer mechanism for cans and caps, cap mechanism and portions of the gearing; Figure 5 is a plan view showing the gearing transmission; Figure 6 is a horizontal sectional view showing the various mechanisms and their relation to each other; Figure 7 is a diagrammatical view illustrating the travel of a can through the apparatus and also the travel of a cap to be secured to a can; Figures 8 and 9 are detail views in plan and elevation respectively illustrating parts of the can feeding mechanism; Figure 9ª is a detail sectional view showing the holding pin 35ª and associated parts; Figure 10 is a sectional view showing one of the units of the can flange-perfecting mechanism with the jaws open and the flanging head in retracted position; Figure 11 is a sectional view partly in elevation taken at right angles to Figure 10; Figures 12, 13 and 14 are views of certain details of the flange perfecting mechanism; Figure 15 is a view illustrating a can having an imperfect flanged portion; Figure 16 is a view of the can after it shall have been operated upon by the flange perfecting mechanism; Figures 17 and 18 and 19 and 20 are views illustrating different positions assumed by parts of the flange perfecting mechanism; Figures 21, 22, 23, 24, 25, 26, 27 and 28 are enlarged views illustrating parts of the can filling mechanism, Figures 29, 30, 31, 32, 32ª, 33 and 33ª are views illustrating parts of the can sealing mechanism; Figures 34, 35, 36 and 37 are detail views illustrating the can and cap valve or transfer mechanism, and Figures 38 to 44 inclusive are detail views showing cap feeding devices.

My improved apparatus comprises can perfecting or shaping mechanism indicated at 1 which will operate to shape an imperfect can $x$ (Fig. 15) and perfect the shaping of the can so that it shall appear as indicated by Figure 16; can filling mechanism shown at 2, and can sealing means represented at 3, Figure 1, and the apparatus also includes mechanisms for feeding cans to the apparatus and transferring them from one mechanism to another; for feeding caps to the sealing mechanism and for feeding filled cans away from the sealing mechanism, without disturbing the vacuous conditions in the chambers in which the cans are filled and sealed.

As more specifically stated, the apparatus contemplates a combination of continuously traveling mechanisms all geared and driven from one main shaft and including a table and mechanism for feeding and controlling the timing of cans to mechanism for rounding up or shaping the can bodies and shaping their flanges; means for transferring the cans to mechanism to effect the exhausting of the cans and the pores of solid food which they may contain; means for temporarily closing the cans when presented to means for filling them with liquid; means for preventing the bulging of the can bottoms when subjected to pressure during the filling operation; means for transferring the cans to sealing mechanism; means for sealing caps to the cans in vacuum, and means for removing sealed cans from the sealing mechanism. Means are provided for exhausting the chambers of the filling and sealing mechanisms, and separate pumps might be provided for the respective mechanisms if high degree of vacuum be desired in the sealed cans, but for a medium degree of vacuum, a single pump will suffice.

The stationary parts and framework are supported upon a common bed or base 4 (Figures 3, 4, 5), and said framework includes a can feed table structure 5, illustrated in detail in Figures 8 and 9, and in proximity to said table structure, the can perfecting mechanism 1 is located and includes a plurality of units 6 (six such units being employed in the embodiment of the invention shown in the drawings as indicated in Figure 6) so that cans fed to said mechanism successively may be operated upon during the continuous operation of said mechanism. The supporting means for the can perfecting mechanism comprises portions of the framework of the apparatus and includes a base bracket 7, supported on standards supported above the bed or base 4 by means of standards 8. The framework of said mechanism includes an upper bracket 9 supported above the lower bracket 7 by a series of posts 10.

The can feed table has mounted therein, a vertical shaft 11 (Fig. 9), to the upper portion of which, a horizontal can feed disk 12 is secured, and to the lower end of said shaft a gear 13 is secured and receives motion constantly from an idle gear 14 secured to a shaft 15 supported by a sleeve 16 forming part of the table structure 5, said idle gear being driven by a gear 17 carried by a shaft 18 mounted to rotate in a bearing sleeve 19 forming part of the table structure 5. The gear 17 is constantly driven as hereinafter explained, and thus motion is transmitted to the can feed disk 12 to continuously rotate the same.

Open cans which may contain solid food may be delivered by any suitable means (not shown) to the revolving feed disk and the cans will be carried by said disk between guides 20, 21 disposed over said disk. The guide 20 is provided with a boss 22 secured to one of the posts 10 of the structure 1 and at one end of the guide 20, a curved guide 23 is provided. The guide 21 is made rigid with a plate 24 (Fig. 8) having a part near the guide 21 through which the shank at the upper end of the shaft 11 passes. The plate 24 is secured to the table structure 5 as shown at 25 and projects into the structure of the can perfecting mechanism as indicated at 26. The part 26 of the plate 24 is made with a lateral arm 27 which enters a groove 28 (Fig. 2) in a central tubular column of a spider 29 in said can-perfecting structure. At one end, part 26 of the plate 24 is provided with a guide flange 30 spaced from the straight portion of a guide 31 to form a guideway 32, and said guide 31 is provided with a plate member 33 secured to the table structure 5, as shown in Figures 8 and 9.

The rotating disk will operate to move a can in front of superimposed levers 34 and 35 carried by a vertical shaft 36 mounted in the table structure 5, the lever 34 being fixed to said shaft and the lever 35 being mounted loosely thereon. A latch 37 is mounted on the loose lever 35 and is normally maintained out of latched engagement with a shouldered portion 38 of the lever 34, by the action of a spring 39, said latch being provided with a lever or trip arm 40 disposed in the path of a can on the rotating feed disk 12. To the lower end portion of the shaft 36, a crank arm 41 is adjustably secured and carries a pin 42, which is connected by a link 43 with an eccentric 44 carried by the lower end of a vertical shaft 45 mounted in the table structure 5, said shaft being provided at its lower end with a gear 46 which receives motion from the gear 17 (see Figs. 2, 5, 8 and 9). With such construction and arrangement of parts, the shaft 36 will be oscillated continuously, the upper lever 34 moving back-and-forth over the can path while the lower loose lever 35 will remain normally at rest. When a can is fed forward by the constantly rotating feed disk 12, said can will engage the latch lever 40 and the two levers will become latched together so that the lower lever 35 will move forwardly with the upper lever 34 and feed the can to the can-perfecting mechanism. When this shall have been accomplished, the spring 39 will operate to disconnect said levers, and as the upper lever 34 recedes, it will engage an arm 47 on the loose lever 35 and cause the latter to be returned to its normal idle position. In order to prevent the lever 34 from dragging lever 35 until a can couples lever 34 with latch lever 40, the lever 35 is provided with a spring-pressed holding pin 35ª having a rounded lower end to engage in a depression 35ᵇ in the underlying plate, as shown in Figure 9.

When a can is moved into the can-perfecting mechanism as above described, it will become deposited upon one of a series of can supporting platforms or pockets 48, each of which is made with a lateral extension 49 to facilitate the subsequent discharge of the can and each of said platforms or pockets is made with a groove 50 for the accommodation of the bottom flange of a can, as shown in Figures 6, 10, 11 and 17 to 20. The platforms or pockets 48 are provided with depending shanks 51 entering sockets in the upper ends of plungers 52 and pinned to the latter, as indicated at 53. The plungers 52 are vertically movable through suitable holes in arms 54 on the spider 29, and each platform or pocket 48 is made with an extension 55 which carries a guide rod 56 entering a hole 57 in one of the spider arms 54. Each plunger 52 carries near its lower end, a roller 58 to cooperate with a grooved cam 59 secured to the lower fixed bracket 7, for raising and lowering the platform or pockets and the can thereon relatively to the devices located above the same which operate to straighten or perfect the open flanged upper ends of the cans,—the details of construction and operation of which will be presently described.

The can raising and lowering devices and the straightening or perfecting devices above referred to constitute one of the units 6 of the can perfecting mechanism, and in the apparatus illustrated in the drawings, six such units are employed, and the movable parts of each of said units are carried by the spider 29. The spider 29 is rotatably supported on ball bearings 60 disposed in the cupped upper end of an enlargement 61 on the lower fixed bracket 7 and, in addition to the radial arms 54, said spider is provided with a horizontal plate member 62 located above the said arms and provided with openings 63 for the accommodation of the upper flanged end of cans when the same are raised by the raising of the can platforms or pockets 48. A driving shaft 64 for the spider 29 passes through the central tubular portion of the latter and is pinned to the same as indicated at 65, the upper portion of said shaft being mounted in a bearing 66 depending from the upper bracket 9. The lower portion of the shaft passes through the enlargement 61 on the lower bracket 7 and depends below the latter. A gear 67 is keyed to the depending end of the shaft 64 and the latter is provided with a threaded shank which receives holding nuts 68 and an interposed washer 69, ball bearings 70 being interposed between said gear and the lower bracket 7. The gear 67 is driven, through the medium of the gears 46 and 17 from a large gear 71 and the latter is driven through the medium of gears 72 and 73 from a gear 74, the latter having secured thereto, a worm wheel 75 receiving motion from a worm 76 on the main driving shaft 77, which latter may be provided with a pulley 78 to receive a belt from any suitable source of power. The main driving shaft 77 may be mounted in a suitable bearing 79 in the lower portion of the frame-work and in a bearing 80 carried by a bracket 81 constituting part of said frame-work, and a suitable clutch 82 may be provided for the pulley 78 as indicated in dotted lines in Figure 4.

The devices for straightening or shaping the flanged open ends of the cans comprise (in each unit 6) a yoke or frame 82 mounted upon and movable with the spider plate 62, and serves as a holder for dies 83, 84 Figs. 12 and 13, disposed over said spider plate adjacent to opening 63 therein. The yoke or frame 82 also serves as a carrier for a vertically movable punch spindle 85 having in its lower end, a socket 86 which receives the shank 87 of a flanging punch head 88 which is movable in the lower portion 89 of the yoke or frame 82 as shown in Figure 2. A spring 90 in the socket 86 serves to permit the punch head to yield and movement of said punch head relatively to the spindle is limited by the pin-and-slot connection indicated at 91. The spindle 85 is prevented from rotation relatively to the yoke or frame 82 by means of a spline 92 and said spindle and the punch head carried thereby are caused to move vertically when the spider 29 is rotated, by the action of a cam 93 secured to the fixed top bracket 9, said spindle 85 being provided with a roller 94 to cooperate with said cam. Levers 95, 95, are pivotally mounted between their ends, as at 96 in diametrically opposite side portions of the yoke or frame (the latter being slotted for this purpose) and their lower ends engage in openings or sockets 97 with which the jaws 83 and 84 are provided. The upper arms of said levers 95 are provided with rollers 98 which cooperate with a cam cone 99 pinned to the spindle 85, so that when said spindle is caused by the cam 93 to move downwardly, the levers 95 will be operated to cause the jaws or dies 83, 84 to move toward each other for engaging the open upper portion of a can when the same is positioned between them. In order that the extent of inward movement of the jaws or dies may be adjusted, the cam cone 99 with which the rollers on the levers cooperate is provided with adjustable threaded members or screws 100 to be engaged by the rollers 98 and these screws may be held at any desired adjustment by means of set screws 101, as shown in Figure 2.

When a can shall have reached one of the platforms or pockets 48 of one of the can perfecting units 6, the parts of said unit will be in the position indicated in Figures 10 and 11. As the spider 29 rotates and the roller 58 travels from the point $a$ to the point $b$ (Fig. 7) of the cam 59, the platform or pocket 48 will be raised so that the upper flanged end of the can will be projected through one of the openings 63 of the spider plate 62 and about one-eighth of an inch above the plane of the jaws or dies 83—84. During same extent of travel of the unit 6, cooperation of the roller 94 with the upper cam 93, will cause the spindle 85 and hence the punch head 88 to descend and its circular flange 88$^a$ to enter the open upper end of the can. The same downward movement of the spindle will cause the cam cone 99 to descend and, through the medium of the levers 95, to move the jaws or dies toward each other and engage the upper edge portion of the can. The positions of the parts will then be as indicated in Figures 19 and 20. The raising of the can sufficiently to cause its flanged upper end to project slightly above the plane of the dies is of importance because the flanges of some cans are badly bent and if not raised above the plane of the dies, the latter might catch the flange and fail properly to clear the same as the spider rotates carrying the can with it to point $c$, Figure 7. When point $c$ is reached, the roller 58 will have entered a depressed portion 102 of the cam 59 (Fig. 18) and the can will then hang on the dies and the flange of the can may be shaped without changing the height of the can. During the travel of the parts from the point $b$ Fig. 7 to the point $c$, roller 94 cooperating with the cam 93, will cause the spindle 85, cone 99 and punch head 88 to move downwardly and effect the closing of the dies around the can and the yielding punch head to force the can down. When the point $c$ (Fig. 7) shall have been reached, the punch head will have been moved down tightly against the can flange and the latter will have been straightened or its shape perfected. In order that the can flange may be kept straight or properly shaped, it is important that the punch be given a sudden hammer blow, otherwise the can flange might spring back to its original shape after having been released from the action of the punch and dies. To accomplish such a blow being imparted to the punch when the can reaches the point $c$ (Fig. 7) and the parts approach the positions shown in Figures 17 and 18, an adjustable screw 103 (Fig. 2) projecting from the upper end of the spindle 85 will engage a cam 104 adjustably secured to the top bracket 9 and made yielding by means of a rubber pad 105. By permitting the cam 104 to yield slightly when it is engaged by the screw in the upper end of the spindle 85, slight inequalities in the thickness of the tin of the can flange or the presence of solder may be compensated for without damage to the tin of the flange. The upper, open flanged end of the can having now been straightened or perfected in shape, the jaws or dies and the flange punch will recede and the can will descend with the descent of the can carrying platform 48 during the travel of the unit 6 from the point $d$ to the point $e$, Figure 7, and the perfected can is ready to be transferred to the mechanism 2 wherein the filling of the can with liquid, such as syrup, is effected, and in the meantime, other cans have been perfected in the mechanism 1 as the spider 29 thereof continues to rotate.

The operation of the various mechanisms will be so timed that the cans will be operated upon successively and transferred from one mechanism to another succeeding without danger of jamming of cans in any of said mechanisms or in their travel to and from the same.

The perfected can will be guided from the can perfecting mechanism 1 to the filling mechanism 2, by the guides 30 and 31 and over the plate 33 and is fed into the filling mechanism by the operation of a double-armed feeding lever 106 carried by the upper end of the vertical shaft 18 as indicated in Figures 8 and 9, the continuous rotation of said lever being so timed that it will meet the can as the same arrives upon the plate 33 and continue its travel to the filling mechanism.

The filling mechanism includes in its structure, a casing 107 having an entrance opening 108 and an exit opening 108$^a$ for cans and interiorly, this casing is made somewhat tapering as shown in Figure 28. The casing 107 is superimposed upon and bolted to a cylindrical bracket 109 supported upon and bolted to a vacuum tank 110 mounted on the base 4 as shown in Figure 3. The vacuum tank may be provided with suitably located man-holes closed by covers such as indicated at 110$^a$, 110$^b$, Figure 3 and with one of said covers a pipe 110$^c$ leading to a suitable pump (not shown) may be connected, and said tank may be provided with a valved drain valve 110$^d$ in the lower man-hole cover 110$^b$. The bracket 109 is provided above the tank 110 with a horizontal portion 111 and the latter is provided with a dome-shaped portion 112, with which latter, a vertical bearing sleeve 113 is made integral. A vertical shaft 114 passes through the sleeve 113 and is provided intermediate of its ends with an annular flange 115, between which and the upper portion of the bearing sleeve 113, anti-friction bearing devices 116 are interposed. To the upper portion of the shaft 114, the hub portion of a spider or carrier 117 is slidingly keyed and said spider is constructed to provide an annular series of pockets or chambers 118, as shown in Figures 2 and 6 and has a freely moving but air-tight fit within the tapering casing 107.

A spring 119 is disposed between the hub portion of said spider and the flange 115 on the shaft 114 as shown in Figure 2 to hold the pocketed spider in proper position in the casing 107 and this spring as well as the flange 115 and anti-friction bearing devices 116, are enclosed by a lubricant cup 120 mounted on the upper portion of the bearing sleeve 113, a tube 121 passing through the hub portion of the spider being provided to supply said cup with lubricant. To the lower end portion of the shaft 114, the gear 71 is keyed and carries a lubricant cup 122 which encloses anti-friction bearing devices 123 disposed between said gear and the lower end of the bearing sleeve 113.

In the embodiment of the invention shown in the drawings, the spider 117 is constructed to form eight pockets 118, and each of these pockets constitutes a separate vacuum chamber, and the chambers are exhausted through pipe connections 124, 125, 126, 127, 128, 129 and 130, as more fully hereinafter explained.

Brackets 131 are bolted to the lower end of the pocketed spider 117,—one such bracket being located directly under each of the eight pockets or chambers 118, and each of said brackets is made with a vertical bearing sleeve 132, through which a plunger 133 is movable,—suitable packing 134 being provided for said plunger.

As illustrated in Figures 24 and 25, each plunger 133 is made with a central bore for the accommodation of a rod 134$^a$, the headed upper end 135 of which enters a socket in a can platform 136 onto which a can will be fed from the can perfecting mechanism, by the operation of the lever 106, and each platform is vertically movable in one of the pockets or vacuum chamber 118. Each platform 136 which is vertically movable in one of the pockets or chambers is yieldingly supported by the plunger 133 with which it is connected, through the medium of a coiled spring 137. The lower end portion of the rod 134$^a$ is made with a slot 138 which receives the end of a pin 139 threaded in the lower portion of the plunger 133. A pin 140 passes transversely through the lower portion of each plunger 133 and projects at both ends beyond the same. On one end portion of the pin 140, a roller 141 is mounted and is disposed between circular cams 142—143 secured to the bracket 109, and said cams are so formed as to effect the raising of the plungers and the cans carried on the platforms to present the cans to liquid filling means and for lowering the plungers and platforms to remove the cans from said filling means, the plungers being guided in their vertical movements and prevented from turning by rollers 142$^a$ carried by the transverse pins 140 and movable in slotted arms 143$^a$ depending from the brackets 131.

In constructing the means for supplying the cans with syrup or other fluid, a bracket 144 is bolted upon the casing 107 and in its central portion, supports a pipe 145, with which latter, a pipe 146 leading to a source of syrup or liquid supply, is connected, and the coupling 147 which connects said pipes may have a gage 148 and a pet cock 149 connected therewith, as shown in Figure 2. The lower end of the pipe 145 enters a hollow casting 150 mounted to rotate on the contracted upper end of the shaft 114 (suitable packing means between said pipe and casting being provided as shown at 151), and this casting is made with a plurality of nipples 152 as shown in Figure 2. In the embodiment of the invention shown in the drawings, eight such nipples are provided and these are connected, by radiating pipes 153, with valve casings 154, disposed over the several pockets or vacuum chambers 118 of the rotating spider 117. Each valve casing is threaded through a base member 155 secured to the spider 117 over a pocket 118 of said spider, so that the outlet of said valve casing may discharge into a can in said pocket and in the upper portion of each pocket 118, a circular horizontal gutter 156 is located. Each base member 155 is recessed to receive a pad 157 surrounding the valve casing 154 and held in place by the flanged lower end of said casing, said pad constituting a yielding seat for the open end of a can to close the same when it is raised to receive syrup. The discharge portion of the valve casing 154 is contracted, forming a seat 158 for a valve 159. This valve is carried at the lower end of a stem 160 which is vertically movable through the casing and through a suitable packing 161 therein and the upper end of said stem is provided with a threaded shank 162 on which nuts 163 are adjustable. A spring 164 encircles the valve stem 160 and bears at its respective ends against a portion of the valve casing and the valve 159.

Each pocket 118 is provided with a recessed portion 165 in which a shaft 166 is located and carries at its lower end, a can ejecting lever 167. Each shaft 166 terminates at its upper end above the rotary pocketed spider or carrier 117, where it has secured thereto, an approximately L-shaped lever 168 carrying a roller 169 to cooperate with a fixed cam 170 as shown in Figure 1, for the purpose of turning the shaft 166 and operating the ejecting lever 167. One member of the lever 168 is provided at its free end with a curved arm 171 (Fig. 21) having a beveled or cam portion 172, as shown in Figure 22, the function of which will be hereinafter explained. A post 173 is vertically movable through a hole in a lateral extension 174 of each valve casing 154 and is normally over the base member through which said casing passes. Each post 173 is provided with a bifurcated head 174a, in which a lever 175 is pivotally mounted. One arm of each lever 175 is bifurcated to embrace the adjacent valve stem shank 162 (below the threaded portion of the latter) and engage one of the nuts 163 on said shank. A cam 176 is secured to the top bracket 144 to be engaged by one arm of each lever 175 to effect the opening of the syrup valve.

When, during the rotation of the pocketed spider or carrier 117, a pocket containing a can shall have passed the inlet opening 108 in the casing 107 and the opening of the pocket through which the can had entered becomes closed by the casing, said pocket will first communicate with the two suction pipe connections 124 and 125 as indicated in Figure 6. During the continued travel of the pocket, it will be caused to communicate successively with the several suction pipe connections 126 to 130. When the pocket 117 shall have passed the seven suction pipe connections 124 to 130 inclusive, the exhausting of the chamber of the pocket will have been completed. During the travel of the pocket 118, the roller 141 at the lower portion of the plunger 133 will travel on the cam 142 and when the point 177 on said cam is reached, the plunger 133 and platform will begin to rise and when the point 178 on said cam 142 shall have been reached, the can will be fully raised with its open upper end pressing against the cushioned seat 157 and the can in position to receive syrup from the valve mechanism. When the can is raised and its upper open end presented to the cushion seat 157, the can will be pressed against said seat with yielding pressure, the can-supporting platform 136 yielding slightly against the resistance of the spring 137, as indicated at the left of Figure 2, and the head 135 at the upper end of the rod 134a will then project slightly above the top of the platform and serve to support the can bottom (Fig. 24) and prevent the same from being bulged outwardly as the can is being filled with syrup. There will be quite a pressure on the liquid, and if the can bottom be not directly supported it would bulge and when the liquid valve is closed and the pressure on the liquid within the can reduced, the can bottom would spring back inwardly and a portion of the liquid would be forced out of the can.

When the can first entered the pocket 118, it engaged the lever 167 (Fig. 6) therein and caused said lever to move back, turning the shaft 166 and causing the arm 171 to become disposed under and therefore to raise the post 173 on which the lever 175 is mounted, as shown in Figures 21 and 22.

The can in the exhausted chamber of one of the pockets 118 having been raised and temporarily closed by engagement with the cushion seat 157, the lever 175 will engage the cam 176 (Fig. 3) and cause the movement of said lever to raise the syrup valve from its seat and thus permit syrup to flow into the exhausted can to fill the latter as well as the pores of the solid food contained in the can, such pores having been exhausted of air when the chamber of the pocket containing the can was exhausted. As the spider or pocketed carrier 117 continues to move, the lever 175 will pass the cam 176 and the syrup valve will close.

In the event that a can failed to enter a pocket 118 from the can perfecting or shaping mechanism, the lever 167 in such pocket would not be moved back and the post 173 which supports lever 175 would not be raised. Under such conditions, the lever 175 over such pocket would not be within reach of the cam 176 when the pocket reaches the syrup valve devices and hence the syrup valve will not be opened, there being no can in the pocket to receive the syrup.

The can in one of the pockets 118 will be filled with syrup while the roller 141 at the lower end of the plunger 133 (Fig. 25) is traveling from the point 178 to the point 179 (Fig. 7) of cam 142. As the roller 141 travels over the portion of the cam 142 from the point 179 (Fig. 7) to the point 180, the can platform and can thereon, will be lowered and the pocket 118 will arrive at the opening 108a of the casing 107, ready to be transferred to the sealing mechanism.

In order that spilling of syrup from the can when it leaves the pad or cushioned seat 157 which served to temporarily close the open end of the can during the syrup filling operation, it is important that the degree of vacuum in the pocket 118 containing said filled can shall be reduced. Thus, at about the time that the filled can begins to descend from the pad or seat 157 and therefore become open, the said pocket will arrive at a port in the casing 107 with which a vacuum reducing or release pipe 181 is connected, said pipe being provided with a vacuum reducing valve 182, as shown in Fig. 3.

It is desirable, in the event of spilling of syrup during the operations of filling and manipulating the cans in the exhausted pockets 118, that any spilled syrup shall be saved for future use. To this end, a circular trough 183 is secured to the vertical wall of the bracket 109, and each bracket 131 is provided with an outlet 184 communicating with a spout 185 secured to each bracket 131. A valve 186 is provided for each spout 185 and is normally closed by the action of a spring 187 to prevent disturbance of the vacuous condition of the overlying pocket 118 of the carrier 117, to which latter the brackets 131 are secured as previously explained. A cam 188 (Figs. 2 and 7) is provided on the bracket 109 to open each valve 186 when the superimposed pocket 118 reaches a position during its travel where the maintenance of a high vacuous condition in the pocket is not essential. When the valve 186 is opened, any syrup which may have accumulated above the same, will be discharged into the trough 183 and from the latter it will be discharged through a pipe 189 (Fig. 3) and permitted to flow into a suitable receptacle (not shown) or conducted back to the syrup supply tank. The gutter 156 adjacent to the syrup valve structure will serve to receive syrup which might escape from a can when it leaves the cushion seat or pad 157 and this gutter is provided with openings 190 (Fig. 22) through which such syrup may escape, and to facilitate escape of syrup from each platform 136, the latter may be provided with ribs 191 (Figs. 24–26) to support the can, the syrup escaping from the can and from the platform 136 entering the bracket 131, the bottom of which latter is inclined to direct the syrup to the outlet 184 with which the spout 185 communicates.

The cam 188 is so located that it will not open the valve 186 until a can has been discharged from a pocket 118 and said pocket shall have passed the can discharge outlet 108ᵃ in the casing 107. After the empty pocket 118 (with its chamber still in a vacuous condition) shall have passed the can discharge outlet 108ᵃ, the vacuum in the pocket will be broken as said pocket registers with a port 192 open to atmosphere and thus prevent an inrush of air into the chamber of the pocket when the valve 186 is subsequently opened to permit the discharge of syrup into the trough 183, which inrush of air would tend to impede the proper discharge of the syrup.

When, during the rotation of the pocketed carrier 117, a pocket 118 containing a filled can approaches the can discharge outlet 108ᵃ, the roller 169 on lever 168 will engage the fixed cam 170 (Fig. 1) whereby said lever will be caused to move and to turn the shaft 166 and thus cause the ejecting lever in the pocket to push the can out of the pocket as indicated in Figure 6 and into the path of a double-armed transfer lever 193, which latter will operate to move the can through a chamber or passage formed by a casing 194. The transfer lever 193 is located within a compartment 194 and is carried by a shaft 195 to which the gear 72 (Fig. 5) is secured.

The stationary parts of the sealing mechanism include a casing 196 secured upon portions 197 of the framework; a bracket frame 198 secured upon said casing, and a hood 199 enclosing said bracket frame and tightly secured in place by means of clamps 200 as indicated in Figure 4, said bracket frame and head being also shown in Figures 31 and 32. Formed and communicating at 201 with the casing 196 is a smaller casing 202 and the transfer compartment 194 is formed by a box-like extension 203 which projects from said casing and is bolted to the casing 107 of the syruping mechanism.

The casing 196 is made with an integral bottom member 203ᵃ from the central portion of which a tubular column 204 projects upwardly and through this column, the tubular portion 205 of a bracket 206 passes the latter carrying a plurality of seaming heads 207 (four such seaming heads being employed in the embodiment of the invention shown in the drawings) and seats or holders 208 for can caps to be double seamed to the cans.

I do not claim herein the specific construction of each seaming head 207, but each of them is constructed and operated in the manner fully shown and described in my co-pending application Serial No. 508,920, wherein the features of novelty of said seaming heads are defined in the claims. Suffice it to say, however, that the operation of the cam 209 of each seaming head 207 is controlled by the passage of rollers 207ᵃ associated with said heads, between cams 210—211 secured to the bracket 198, and that the spring-sustained ejector 212 of each seaming head is depressed by a cam 213 (Fig. 31) secured to said bracket 198. It may also be explained that each seaming head 207 carries a gear 213' which receives motion from a gear 214 keyed to a central vertical shaft 215 extending through the tubular portion 205 of the bracket 206 and through the hub of a part 206ᵃ forming in effect, part of said bracket. This shaft has a bearing in the upper bracket 198 as indicated at 216 (Figs. 4 and 31) and to its lower end, a pinion 217 is keyed and receives motion from an idle gear 218 (Fig. 5), the latter receiving motion from a gear 219 on a shaft 220, and said shaft 220 carries a bevel gear 221 receiving motion from a bevel gear 222 on the main drive shaft 77.

The casings 196 and 202 and the extension 203 form a housing which is made air-tight and may be provided with an opening 223 to permit access to the mechanism therein, said opening being closed air-tight by a cover 224. The housing above described will be exhausted so that the sealing of caps to the cans may be accomplished in vacuum and so that the caps may be fed into the sealing chamber and the sealed cans discharged from the machine without disturbing the vacuous condition in the chamber in which the sealing is accomplished. A pipe 225 communicates with the interior of the casing 196 and this pipe is connected with a suitable exhausting or vacuum pump (not shown) or said pipe may be connected with the vacuum tank 110.

Four seaming mechanisms 207 are provided and within the casing 196 a bracket 226 is located and bolted to the bracket 206. The bracket 226 is provided with bearings 227 (Figs. 32ᵃ and 33ᵃ) for a series of four plungers 228, one in vertical alignment with the axis of each of the seaming mechanisms 207. Each plunger 228 is prevented from turning by a key 229 and each of said plungers is socketed to receive a stem 230 (Fig. 30) of a head or can carrier or support 231, a spring 232 being disposed in each plunger between the bottom of the socket therein and the lower end of the stem 230 and the latter is provided with a transverse slot 233 through which a pin 234 carried by the plunger 228 passes. A plate 235 is secured to each head or carrier 231 and made with a serrated or roughened upper face on which a can to be sealed rests and by means of which the can is prevented from turning during the seaming operation, and each plate 235 is made with an arm 236 having a curved edge to conform to the contour of the wall of the casing 196. Each plunger 228 is provided at its lower end with a roller 237 movable in a cam-way formed by cam rings 238 and 239 secured to the bottom 203ᵃ of the casing 196 and the column 204 respectively, so that when the bracket 226 is rotated, the plungers will be moved vertically to raise the plunger heads or carriers and present the cans to the seaming mechanism to have caps seamed to them, and to move said plungers and heads or carriers to lower the cans when the seaming operations shall have been completed. The gear 74 and worm wheel 75 (Figs. 4 and 5) are keyed (below the casing 196) to the lower end of the central tubular portion 205 of the bracket 206 and these gears being driven from the main shaft 77, and as the bracket 206 is secured to the bracket 226, these brackets will be continuously rotated simultaneously to rotate the several seaming mechanisms 207 and the bracket which carries the cans to be sealed, about a common axis, each individual seaming mechanism or seaming head being itself rotated on its own axis to effect the seaming of a cap to a can, by the gearing 213'—214 (Figs. 31 and 32) as previously explained.

The casing member 202 which communicates with the casing member 196 at 201, is provided with a discharge opening 240 (Fig. 6) and the said casing member 202 contains a valve 241 carried by a shaft 242 and is divided by a transverse partition 243 into two compartments, each having an opening 244, and said shaft is provided at its lower end with a pinion 245, the latter receiving motion, through idle pinions 246 and 247 from the gear 74, as shown in Figures 4 and 5. Bushings 248 are disposed between the valve 241 and the wall of the casing member 202, and the latter is split and provided with flanges as indicated at 249, said flanges being connected by bolts 250. The valve 241 is shown as having a taper fit between the bushings 248, and is vertically movable on the shaft 242 and is normally sustained in position and prevented from jamming by a spring 251 as shown in Figures 34 and 36.

At the base of the casing 196 of the seaming mechanism, a bracket 252 (Fig. 4) is located and provided with a vertical tubular column 253 (Figs. 4, 34, 36) through which the valve shaft 242 passes. To the upper portion of this column, cams 254 and 255 are secured for a purpose hereinafter explained.

To the brackets 252, a cap magazine bracket 256 is secured and supports a cap magazine 257 comprising a plurality of spaced posts and at the lower ends of said posts a magazine base plate 258 is secured. The magazine base 258 supports diametrically disposed sliding blades 259–260 which serve normally to support the pile of can caps in the magazine and to control the dropping of said caps, one at a time, through an opening 261, and onto guides 262, 263 secured to the underside of said base 258. The blades 259—260 are operated in such manner that they will move simultaneously in opposite directions to effect the dropping of a cap and the dropping of the caps must be properly timed so that when a cap is conveyed into the sealing mechanism, (as hereinafter described) it will become seated at 208 at the proper time to be seamed to a can when the latter is raised for this purpose. The devices for operating the cap dropping blades, properly timed, will now be explained. A lever 264 pivotally mounted at 265 (Figs. 38–40) is pivotally connected at one end with the blade 259, and to the other end of said lever, the long arm of an L-shaped link 266 is pivoted, the shorter arm of said link being pivotally connected with the blade 260. A long lever 267 is pivoted between its ends to a bracket 268 (Figs. 1 and 6) on the casing 107 of the can filling mechanism as shown in Figures 1 and 6 and is connected at one end with the cap dropping blade 259 by means of a link 269 as shown in Figures 38 and 40. The other end of the lever 267 is provided with a cam 270 (Figures 1 and 6) to be engaged by one of the rollers 169 of the can filling mechanism when the can in the latter is raised to receive the syrup as previously explained. Should there be no can in one of the pockets of the filling mechanism when said pocket arrives at the syrup filling position, the roller 169 on the lever 168 above such pocket would not be properly positioned to operate the lever 267 and hence, under such conditions, no cap will be dropped.

When a can cap shall have been dropped onto the guides 262—263, it will be engaged by a lever 271 and moved thereby into one of the compartments of the valve 241, in the upper portion of which latter, said cap being supported by guides 272. The cap feed lever 271 rotates continuously and is carried by the upper end of a shaft 273 (Figs. 4, 5, 38, 40 and 41) provided at its lower end with a pinion 274 which is driven, through pinions 275 and 276 (Figs. 4 and 5) from the gear 245.

When a cap has been dropped from the magazine for a can which is on its way through the syrup filling mechanism, it is important to guard against the dropping of another cap before another can shall have entered the filling mechanism. To accomplish this result, a cam 277 is secured to the upper end of shaft 273, so that when the lever 267 has operated to effect the dropping of a cap, the cam 277 will engage a lug 278 on the blade 260 (Fig. 42) and cause the connected blades to move under the bottom of the stack in the magazine before the lever 271 has operated to feed the dropped cap to the valve 241. It will therefore be seen that the next cap cannot be dropped until the lever 267 shall have been again actuated in the manner previously explained.

A can cap having been dropped from the magazine and feed into the valve, it will be fed from the valve and deposited on one of the cap seats 208 in the sealing mechanism ready to be seamed to a can body. The valve 241 (which rotates continuously) carries two shafts 278 (one in each compartment of said valve) and each of these shafts carries a feed arm 279 to engage a cap and feed it to its seat 208 in the sealing mechanism. Each shaft 278 is provided at its lower end with an arm 280 which carries a roller 281 to cooperate with the cam 255 (Figures 4, 34, 35, 36, 37) for the purpose of turning said shaft to actuate the cap feed arms.

The valve 241 also carries two shafts 282 each provided with a curved ejector arm 283 (one in each compartment of said valve) and each of these shafts is provided at its lower end with an arm 284 carrying a roller 285 to cooperate with the cam 254, whereby said curved ejector arms are actuated.

Located within the casing 196 of the sealing mechanism and adjacent to the opening 201 between said casing and the casing 202 of the valve 241, is a cam arm 286 as shown in Figure 6, and each of the plunger heads 231 of the sealing mechanism is slotted as at 287 (Figs. 4 and 30) for the accommodation of said cam arm. After a cap has been seamed to a can, and the plunger head 231 carrying the sealed can shall have been lowered away from the seaming head 207 while the bracket 226 is revolving, the can will, as bracket continues to travel, engage the cam arm 286 and be caused thereby to be moved out of the casing 196 through the opening 201 and into one of the compartments of the valve 241 and in front of one of the ejector arms 283. The valve 241 will, during its continuous rotation, carry the can to the discharge opening 240 and as it reaches the latter, the ejector arm behind it will be operated by the fixed cam 254 on the column 253, and the sealed can will be ejected from the valve 241 and may be received by a suitable conveyor, trough or chute, not shown.

In the diagrammatical view, Figure 7, I have indicated by the dotted line 288, the travel of a can through the apparatus, and the dotted arrow line 289 indicates the travel of a cap from the cap magazine, through the valve in the casing 202 to position in the sealing mechanism to be seamed to a can body.

I have heretofore explained that the degree of vacuum is reduced in the vacuum chamber of a pocket of the filling mechanism after a can has been filled with liquid and that such reduction may be accomplished by means of a valve 182 in a vacuum reducing or release pipe 181 as shown in Figure 3, but it may here be explained that the reduction of degree of vacuum in the chambers of said pockets may be reduced by connecting a pipe 290 (Figs. 1, 3 and 6) at one end with the pipe 181 and at the other end with the casing of the cap and can valve 241, said pipe being provided with a valve 291. With this arrangement, by manipulating the valves 182 and 291, the vacuum in the chamber of one of the pockets 118 of the filling mechanism may be released completely or adjusted to the height desired. Opening valve 291 and closing valve 182 will cause the degree of vacuum in a chamber or pocket 118 to be reduced. If there is, say 28" of vacuum in said pocket or chamber and one of the compartments of the cap and can valve 241 is full of air, on opening the valve 291 (valve 182 being closed) air will rush from said compartment of the valve 241 to a pocket or chamber 118 and the degree of vacuum in the chamber of pocket 118 will be reduced about fifty per cent. If a less vacuum release be desired, this may be accomplished by manipulation of the valve 291. When complete vacuum release is desired, the valve 291 will be closed and the valve 182 opened to the atmosphere. Should the degree of vacuum in the chamber of the sealing mechanism be reduced by the above described manipulations, it may be readily increased by controlling the exhausting means.

Various changes might be made in the details of construction of my invention without departing from the spirit thereof or limiting its scope and hence I do not wish to restrict myself to the precise detail herein set forth.

Having fully described my invention, what I claim as new and desire to secure by Letters-Patent, is:—

1. In apparatus of the character described, the combination with two casings, a passageway connecting said casings, and exhausting means for said casings, of a plurality of mechanisms for filling cans in vacuum in one of said casings, a plurality of mechanisms for sealing cans in vacuum in the other of said casings, means for continuously operating said mechanisms, a rotating transfer lever in said passage-way, means for ejecting cans from the filling mechanisms and into said passage-way in the path of said transfer lever, and means for continuously rotating said transfer lever to transfer the cans to the sealing mechanisms.

2. In apparatus of the character described, the combination of can filling mechanism, can sealing mechanism, cap feeding mechanism, and means controlled by cans in the can filling mechanism for controlling the feeding of caps by said cap feed mechanism.

3. In apparatus of the character described, the combination of a plurality of traveling mechanisms for filling cans in vacuum, a plurality of traveling mechanisms for sealing caps to cans in vacuum, continuously operating means for transferring cans from the filling to the sealing mechanisms, a rotating valve, means in said valve for feeding caps to the sealing mechanisms, means for discharging sealed cans from the sealing mechanisms to said valve, means in said valve for ejecting sealed cans therefrom, and means for continuously operating said means and mechanisms in timed relation relatively to each other.

In testimony whereof, I have signed this specification.

ADOLPH K. MALMQUIST.